(12) United States Patent
Brooker et al.

(10) Patent No.: US 11,479,921 B2
(45) Date of Patent: Oct. 25, 2022

(54) CABLE TROUGH

(71) Applicant: NORTHSTONE (NI) LIMITED, Belfast (GB)

(72) Inventors: Steven Brooker, Craigavon (GB); Nuala Maskey, Belfast (GB)

(73) Assignee: NORTHSTONE (NI) LIMITED, Belfast (GB)

( * ) Notice: Subject to any disclaimer, the term of this patent is extended or adjusted under 35 U.S.C. 154(b) by 372 days.

(21) Appl. No.: 16/753,331

(22) PCT Filed: Oct. 1, 2018

(86) PCT No.: PCT/GB2018/052797
§ 371 (c)(1),
(2) Date: Apr. 2, 2020

(87) PCT Pub. No.: WO2019/069065
PCT Pub. Date: Apr. 11, 2019

(65) Prior Publication Data
US 2020/0277739 A1 Sep. 3, 2020

(30) Foreign Application Priority Data
Oct. 3, 2017 (GB) ..................................... 1716133

(51) Int. Cl.
*H02G 9/04* (2006.01)
*E01B 26/00* (2006.01)

(52) U.S. Cl.
CPC .............. *E01B 26/00* (2013.01); *H02G 9/04* (2013.01)

(58) Field of Classification Search
CPC .. H02G 9/04; H02G 9/00; H02G 9/06; H02G 3/00; H02G 3/04; H02G 3/0406; H02G 3/0418; H02G 3/0431; H02G 3/0437; H02G 3/22; H02G 3/283; H02G 3/285; E01B 26/00; H01R 27/00; H01R 27/02
USPC .......... 174/68.1, 480, 481, 72 C, 68.3, 88 R, 174/70 C, 95, 97, 99, 101; 248/49, 68.1; 52/220.1, 220.7, 220.8; 385/134, 135
See application file for complete search history.

(56) References Cited

U.S. PATENT DOCUMENTS 1,823,819 A 9/1931 Crampton
5,469,893 A * 11/1995 Caveney .............. H02G 3/0608
174/101

(Continued)

FOREIGN PATENT DOCUMENTS

CH 706129 B1 8/2013
EP 1807918 A1 7/2007

(Continued)

*Primary Examiner* — Angel R Estrada
(74) *Attorney, Agent, or Firm* — Schwabe Williamson & Wyatt, P.C.

(57) ABSTRACT

A cable trough (1) has a base (2) a plurality of sidewalls (3) and open ends (5, 6) arranged for connection to the open end of another cable trough to form a cable trough system. Both open ends (5, 6) are provided with a multiway connector (25, 26). The multiway connectors (25, 26) comprise both a groove (9) to receive the tongue (11) of another cable trough and a tongue for insertion into the groove of another cable trough. Both ends are capable of connection to a male connector (16) of another cable trough, comprising a tongue, and capable of connection to a female connector (15) of another cable trough, comprising a groove.

21 Claims, 14 Drawing Sheets

(56) References Cited

U.S. PATENT DOCUMENTS

| | | | | |
|---|---|---|---|---|
| 5,639,048 A * | 6/1997 | Bartholomew | H02G 3/0456 | 248/68.1 |
| 5,942,729 A * | 8/1999 | Carlson, Jr. | H02G 3/0418 | 174/66 |
| 6,037,543 A * | 3/2000 | Nicoli | H02G 3/0608 | 174/101 |
| 6,284,975 B1 * | 9/2001 | McCord | H02G 3/0608 | 174/71 R |
| 6,708,918 B2 * | 3/2004 | Ferris | H02G 3/0406 | 242/615 |
| 6,756,539 B1 * | 6/2004 | VanderVelde | H02G 3/0608 | 52/36.2 |
| 6,909,044 B2 * | 6/2005 | Ewer | H02G 3/0608 | 174/68.3 |
| 6,916,986 B1 * | 7/2005 | Herzog | H02G 3/0418 | 174/68.3 |
| 7,034,227 B2 * | 4/2006 | Fox | H02G 3/0608 | 174/101 |
| 7,825,342 B2 * | 11/2010 | Caveney | H02G 3/0608 | 174/101 |
| 7,964,804 B2 * | 6/2011 | Kaplan | H02G 3/0431 | 174/101 |
| 8,558,112 B2 * | 10/2013 | Pawluk | H02G 3/0437 | 174/72 A |
| 2003/0047343 A1 | 3/2003 | Ferris | | |
| 2008/0199251 A1 | 8/2008 | Beck | | |
| 2011/0278038 A1 | 11/2011 | Wellens | | |

FOREIGN PATENT DOCUMENTS

| | | |
|---|---|---|
| EP | 2975717 A1 | 1/2016 |
| WO | WO9847212 A1 | 10/1998 |
| WO | WO2011073603 A1 | 6/2011 |
| WO | WO2013124761 A2 | 8/2013 |
| WO | WO2014195727 A1 | 12/2014 |

* cited by examiner

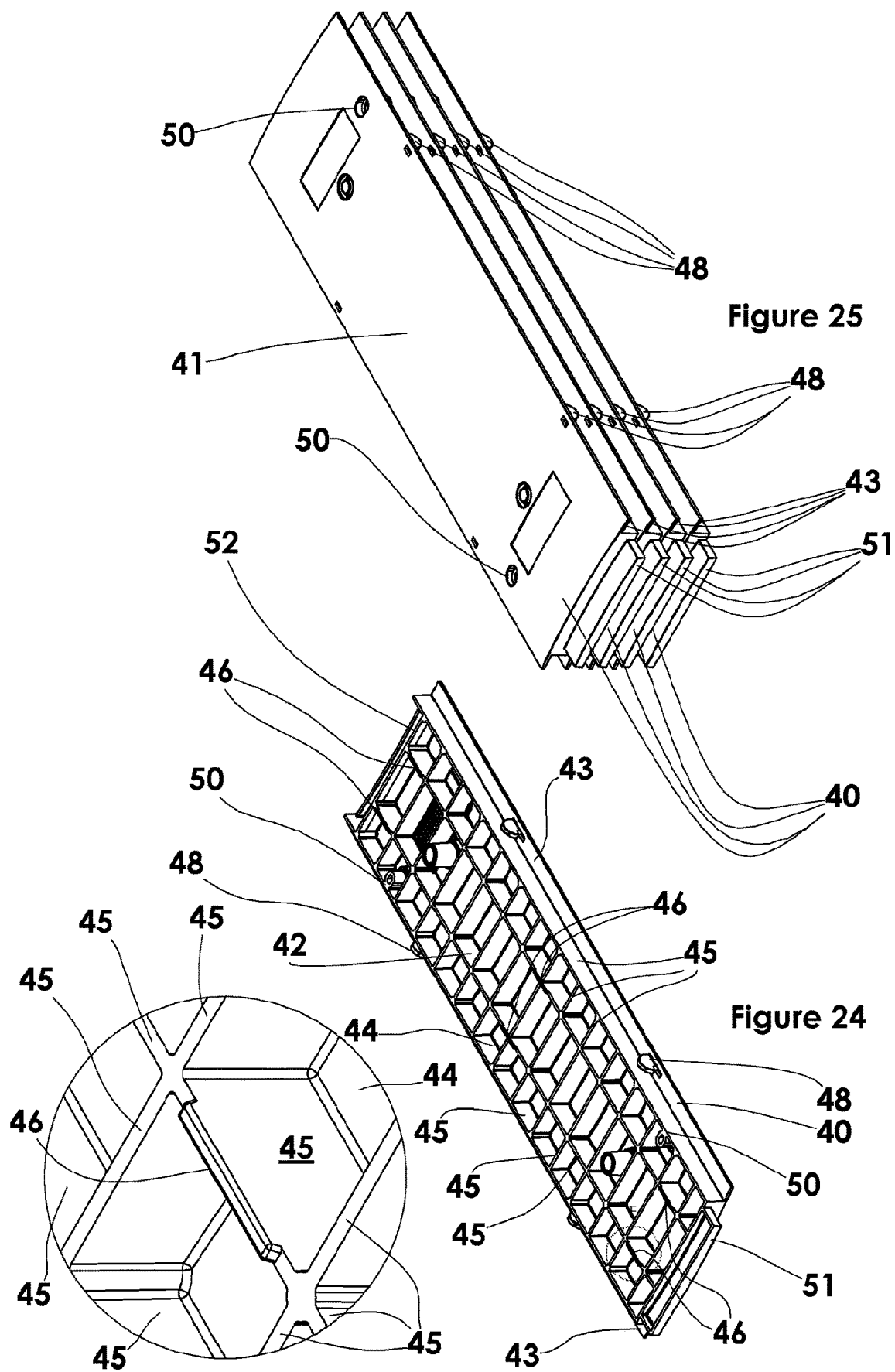

CABLE TROUGH

CROSS REFERENCE TO RELATED APPLICATIONS

The present application is a national phase entry under 35 U.S.C. § 371 of International Application No. PCT/GB2018/052797, filed Oct. 1, 2018, entitled "CABLE TROUGH," which designated, among the various States, the United States of America, and which claims priority to GB1716133.2 filed Oct. 3, 2017, both of which are hereby incorporated by reference in their entirety.

TECHNICAL FIELD OF THE INVENTION

The present invention relates to cable troughs for housing cables. In particular, the invention relates to cable troughs of the type used to protect cables in outdoor environments typically at or near surface level, such as those used in power and transportation, especially, but not exclusively, in the rail industry, alongside rail tracks.

BACKGROUND TO THE INVENTION

In railway infrastructure, electrical cables are commonly used to convey signals and power for railway signal systems. The cables are typically arranged alongside railway tracks on a track bed in cable troughs.

These cable troughs have a base, sidewalls and are open at their ends. They are typically laid end-to-end, to form a cable trough system, in the form of a long channel in which cables are guided and organised. The troughs restrict the movement of the cables, and frequently shield them from view, and from the elements, under a lid.

Cable troughs are typically made up of pre-cast concrete trough sections as described the preamble of WO2014/195727 as concrete is cheap and heavy, which is a benefit in terms of keeping the trough sections in place even on an uneven surface of track ballast. However, WO2014/195727 also proposes making troughs out of plastics or GRP.

Cable toughs formed of HDPE are sold by Cubis Industries (a trading name of Northstone NI Limited) under the name "Railduct", with cable troughs made from GRP sold as "Railduct MM".

In view of the fact that they are made of lighter material, these cable troughs are formed so as to be connected together at their ends. In the standard "Railduct" product, this is by way of a "twist and lock" jointing system, in which the base of each end has both a hook and a recess, whereby each hook can be manoeuvred into the corresponding recess by lifting both ends off the ground, arranging the hook and recess of one trough at 90 degrees to the other, then twisting the trough through 90 degrees, such that the hook of each trough engages with the recess in the other trough.

The Railduct MM, on the other hand, has a connection system which does not require the twisting of one of the troughs. Instead, both sidewalls of both ends of each trough are formed with a T-shaped slot (extending vertically), thus, when the troughs are arranged end-to-end, the T-shaped slots in opposing sidewalls form an H-shape, and H-shaped pegs are pushed down to connect each sidewall.

The present invention seeks to provide improved cable troughs.

SUMMARY OF THE INVENTION

In broad terms, the invention relates to cable troughs having a base, a plurality of sidewalls, a first open end and a second open end, each open end arranged for connection to the open end of another cable trough to form a cable trough system; and having one or more of the optional features described below.

According to a first aspect of the invention, there is provided a cable trough having a base, a plurality of sidewalls, a first open end and a second open end, each open end arranged for connection to the open end of another cable trough to form a cable trough system; wherein both the first open end and the second open end are provided with a multiway connector, the multiway connectors comprising both a groove to receive the tongue of another cable trough and a tongue for insertion into the groove of another cable trough, whereby both ends are capable of connection to a male connector of another cable trough, comprising a tongue, and capable of connection to a female connector of another cable trough, comprising a groove.

The expression "multiway connector" is to be understood as a connector capable of connection to a plurality of different connectors, i.e. capable of connection to a male connector of another cable trough, comprising a tongue, and also capable of connection to a female connector of another cable trough, comprising a groove.

The claimed multiway connectors allow great flexibility in connection of different cable troughs in a cable trough system. The tongue and groove system is also much easier to connect than that of the "Railduct" system, in which both ends of the ducting need to be raised for connection. In the cable trough according to the invention, another cable trough having a male connector with a tongue, can simply be dropped down to slot into the groove of the multiway connectors, with the cable trough of the invention resting on the ground. Similarly, the cable trough according to the invention can simply be dropped down such that the tongue of its multiway connector slots into the groove of a female connector of another cable trough, whilst that cable trough rests on the ground.

Moreover, unlike the "Railduct MM" system, no additional parts (e.g. pegs) are required to make the connection between troughs in a trough system.

At both ends, the groove of the multiway connector may be arranged inboard of the tongue of the multiway connector.

The groove of each multiway connector may be provided in the base. The grooves may be provided in the upper side of the base. The grooves may (additionally or alternatively) be provided in a sidewall, or in a plurality of sidewalls. The grooves may be provided on the inside of the sidewall or plurality of sidewalls.

The tongue of each multiway connector may be provided on the base. The tongues may be provided on the underside of the base. The tongues may be provided on a sidewall, or on a plurality of sidewalls. The tongues may be provided on the inside of the sidewalls. The tongues may be provided at the extreme ends of the cable trough.

The first end may be provided with a male multiway connector and the second end may be provided with a female multiway connector, wherein a male multiway connector has its tongue spaced further from its groove than a female multiway connector, whereby the tongue of a male multiway connector can fit into the groove of a female multiway connector.

The cable trough may comprise a bend or curve, whereby the open face of one open end is at an angle to the open face of the other open end. The bend or curve may have a radius of not more than 30 degrees, for example between 10 and 20 degrees, such as 15 degrees. And, the cable troughs with the curve may be between 30 and 60 cm long, for example between 40 and 50 cm long, such as about 45 cm long. This low radius allows for the required curvature of thick cables whilst allowing obstacles to be avoided. The provision of a multiway adapter is particularly useful where the cable troughs have a bend or curve, because it means the same cable trough can be used in two orientations, i.e. turning left or turning right, connected to either the male end or the female end of another cable trough via either multiway connector.

The cable trough may be an adapter. The adapter may be a cable trough having a shorter length than a standard cable trough (normally 1 metre), such as less than 50 cm, less than 30 cm or about 20 cm. The adapter may have a length shorter than its width.

The provision of a cable trough according to the first aspect of the invention (i.e. with multiway connectors) as an adapter is particularly useful, since the adapter can bridge small gaps, and can connect what would otherwise be female to female or male to male connections between a standard trough with a male connector at one end and a female connector a the other end, and a T-section, or 4-way junction box, which may have (for example) only female connectors.

The invention extends to a kit of cable troughs for forming a cable trough system, the kit comprising at least one first cable trough as set out in the first aspect of the invention, provided with two multiway connectors, and optionally including any optional features; and one or more of: (i) a second cable trough having at least two open ends wherein the first end comprises a female connector comprising a groove (and preferably not comprising a tongue) and the second end comprises a male connector comprising a tongue (and preferably not comprising a groove); (ii) a third cable trough comprising a T-piece, having three open ends, each end comprising a male connector comprising a tongue (and preferably not comprising a groove) or female connector comprising a groove (and preferably not comprising a tongue) (preferably each end comprising a female connector); and (iii) a fourth cable trough comprising a junction box having at least four open ends, each end comprising a male connector comprising a tongue (and preferably not comprising a groove) or female connector comprising a groove (and preferably not comprising a tongue) (preferably each end comprising a female connector).

The kit may comprise at least two first cable troughs according to the first aspect of the invention, wherein at least one of the first cable troughs comprises a bend or curve and wherein at least one of the first cable troughs is an adapter.

The kit may comprise at least one second cable trough as defined in (i) above and at least one third cable trough as defined in (ii) above; or at least one second cable trough as defined in (i) above and at least one fourth cable trough as defined in (iii) above; or at least one third cable trough as defined in (ii) above and at least one fourth cable trough as defined in (iii) above. Or, the kit may comprise at least one second cable trough as defined in (i) above; and at least one third cable trough as defined in (ii) above; and at least one fourth cable trough as defined in (iii).

The second cable trough defined in (i) above may be straight. It may be about 1 metre in length. It may have a female end identical to the female ends of the third cable trough defined in (ii) above, or the fourth cable trough defined in (iii) above.

The second cable trough defined in (i) above, or indeed the cable trough of the invention as defined most broadly, or indeed a cable trough according to the first aspect of the invention may comprise a cable tie securing system integrally formed in its base. The cable tie securing system may comprise a plurality of apertures arranged either side of a centreline of the trough and extending through its base, so as to receive a cable tie. Each aperture may extend through to the bottom of the trough. Each aperture may be angled so as to guide a cable tie towards the centreline of the trough, below its base. Each aperture may be curved, to guide the cable tie. The cable tie securing system may comprise a guide arranged beneath the base of the cable trough to guide the cable tie from one aperture to the other aperture. The guide may be a cover attached to the underside of the trough and having a channel which lines up with the exit of each aperture at the base, to form a smooth path between the entrances of the apertures in the upper side of the base. This system allows a cable tie to be retrofitted through the apertures to secure the cables to the cable trough itself, not to an accessory attached to the cable trough. This then is a particularly secure manner of attachment compared, for example, to that described in WO2014/195727.

The second cable trough defined in (i) above, or the cable trough of the invention as defined most broadly, or indeed a cable trough according to the first aspect of the invention may comprise a plurality of pairs of slots arranged in the base, and capable of allowing drainage and receiving a cable divider. The pairs of slots may be arranged towards opposite ends of the cable trough. The pairs of slots may be aligned with the axis between the two ends of the cable trough. Three pairs of slots may be provided. The three pairs of slots may be arranged such that one is central and the others are either side of the central pair. In this manner, if (as is most likely), the central slots are used to receive a divider, there will be a pair of slots on both sides of the divider through which water can drain. Alternatively, the divider could be arranged asymmetrically to separate a smaller bundle of cables from a larger bundle of cables.

The second cable trough defined in (i) above, or indeed the cable trough of the invention as defined most broadly, or indeed a cable trough according to the first aspect of the invention may comprise integrally formed ribs in the outer surface of the sidewall, to act as ballast anchors and handles. The ribs may extend substantially horizontally. The outer surface of the sidewalls may be corrugated, whilst the inner surface of the sidewalls may be flat, and the ribs may be provided in regions where the sidewalls are thinner as a consequence of the corrugation. The ribs may be at least 5 cm long and at least 1 cm from the base of the trough, preferably at least 2 cm, e.g. 5 cm from the base of the trough.

As discussed above, the first cable trough(s) of the first aspect of the invention have multiway connectors which can fit into the female connectors of the second, third and fourth cable troughs, and which can receive the male connector of the second cable troughs (and third and fourth cable troughs, if they are provided with male connectors). This fitting, whereby the tongues of male connectors are received in corresponding grooves, or tongues of the multiway connectors engage in the groove of the female connectors allows for positive retention of all connected parts. In particular, with the male ends being received in the multiway connectors at the end, and the female members receiving the multiway connectors, lateral retention can be achieved.

The tolerances of the tongues and grooves can be chosen to allow a certain amount of movement, for example up to 20 mm between the male connector and the female connector, to allow a degree of direction change between cable troughs to account for slight deviations in the direction of tracks (e.g. deviations so small that curved or bent cable troughs are not required).

In a second aspect of the invention, there is provided a lid for a cable trough (optionally a cable trough as defined above, including any optional features), the lid arranged to be seated on the top of the sidewalls of the cable trough, having an upper surface inclined towards two sides, away from a centreline, in order to aid drainage; wherein the lid has a foot, or feet on its underside so as to allow one lid to be stacked stably on another for transportation, despite the inclined upper surface.

The inclined upper surface may be domed; curving downwards towards each side.

At least two feet may be provided, one either side of the centreline. The feet may be provided in pairs, one foot in each pair either side of the centreline. A plurality of pairs of feet may be provided.

The feet may be arranged approximately half way between the centreline and the respective side; more broadly they may be arranged between 40% and 60% of the distance from the centreline to the respective side, or more broadly still, between 30% and 70% of the distance from the centreline to the respective side. A longer distance from the centreline leads to greater stability, since the feet are spaced further apart, whilst a shorter distance means the feet can be shorter, since the incline from the centreline will be less.

The lid may be provided with connection means for connecting to the sidewalls of a cable trough. The connection means may be so-called "duck's feet", arranged to be inserted into slots through the upper surface of the sidewalls and engage underneath the upper surface.

The duck's feet on one side may be offset relative to the duck's feet on the opposite side. The slots may be correspondingly offset, such that the lid can only be introduced in one orientation.

The duck's feet may be arranged such that they are engaged under the upper surface of the sidewalls by sliding the lid longitudinally, i.e. in line with the centreline. The connection means allows the lid to be kept shut before it is fastened in place. The lid may be provided with fastening means. Various fastening means are known in the art, such as bolts arranged in suitable apertures through the lid to engage with the cable trough.

The invention extends to a kit of parts comprising a cable trough according to the first aspect of the invention, or the broadest aspect of the invention, optionally including any optional features, and a lid according to the second aspect of the invention, including any optional features.

Moreover, the invention extends to a kit of parts as defined above, optionally including any optional features, wherein each cable trough comprises a lid as defined in the second aspect of the invention, optionally including any optional features.

The cable trough and/or the lid of the invention may be moulded from glass reinforced polymer (GRP). Alternatively they could be formed from a polymer without the glass fibre reinforcement. In yet another alternative, another composite material could be used to form the cable trough and/or the lid. Most preferably the cable trough is formed from a fire retardant composite material such as GRP with fire retardant additives in the formulation, to meet the stringent fire standards in place for rail tunnel applications.

A further aspect of the invention is a set comprising a cable trough as set out above, optionally including any optional feature, and a lid according to the second aspect of the invention; or a set comprising a kit as set out above, optionally including any optional feature, and a lid for one or each cable trough in the set (optionally wherein the lid is a lid according to the second aspect of the invention and preferably wherein at least the lid for the second cable trough defined in (i) is a lid according to the second aspect of the invention), wherein, when assembled, with the lid(s) on the cable trough(s) and the cable trough(s) connected at at least one end to another cable trough, there is no gap between the or each cable trough and its respective lid or between connected cable troughs, so as to prevent the ingress of dirt or vermin.

In particular, in a set comprising (a) a kit comprising at least one first cable trough as set out in the first aspect of the invention, provided with two multiway connectors, and optionally including any optional features; and one or more of: the troughs identified (i), (ii) and (ii), each of which comprises at least one female connector comprising a groove and preferably not comprising a tongue, and (b) a lid for each cable trough, there may be no gaps between the cable toughs, regardless of the manner in which they are connected (i.e. male connector to female connector, male connector to male multiway connector, male connector to female multiway connector, male multiway connector to female connector, male multiway connector to female multiway connector, or female multiway connector to female connector); no gap between cable troughs and their respective lids; and no gap between adjacent lids except where a female multiway connector is connected to a female connector. Where a female multiway connector is connected to a female connector, the gap between their lids may be no more than 2 mm, for example 1 mm. The reason for this is that the manner of use of the duck's feet preferably involves moving the lid about 1-2 mm in the direction of the end comprising a male connector, or male multiway connector, so where the female meets the female multiway connector, the lid is moved away from region of the connection.

DETAILED DESCRIPTION OF THE INVENTION

In order that the invention may be more clearly understood embodiments thereof will now be described, by way of example only, with reference to the accompanying drawings, of which:

FIG. 9 is a side view of the cable trough of FIGS. 7 and 8 with the lid on;

FIG. 24 is an underneath perspective view of the lid of the cable trough of FIG. 1;

FIG. 25 is a perspective view of four lids of FIG. 24 stacked on top of each other;

FIGS. 1 to 3 illustrate a cable trough 1 according to the broad aspect of the invention, for use in forming a cable trough system to house cable located alongside a railway line.

Figures 1, 2:
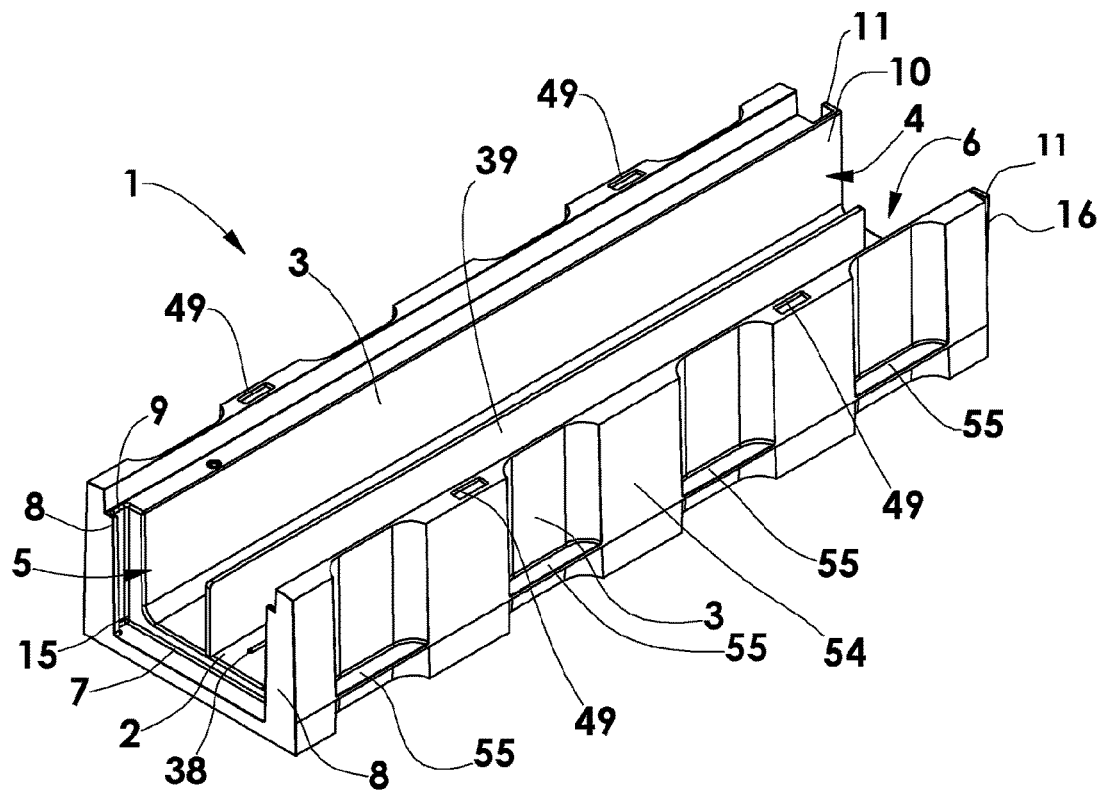
FIG. 1 is a perspective view of a straight cable trough having a male end and a female end and also including a divider.
FIG. 2 is a plan view of the cable trough of FIG. 1.
Figure 3:
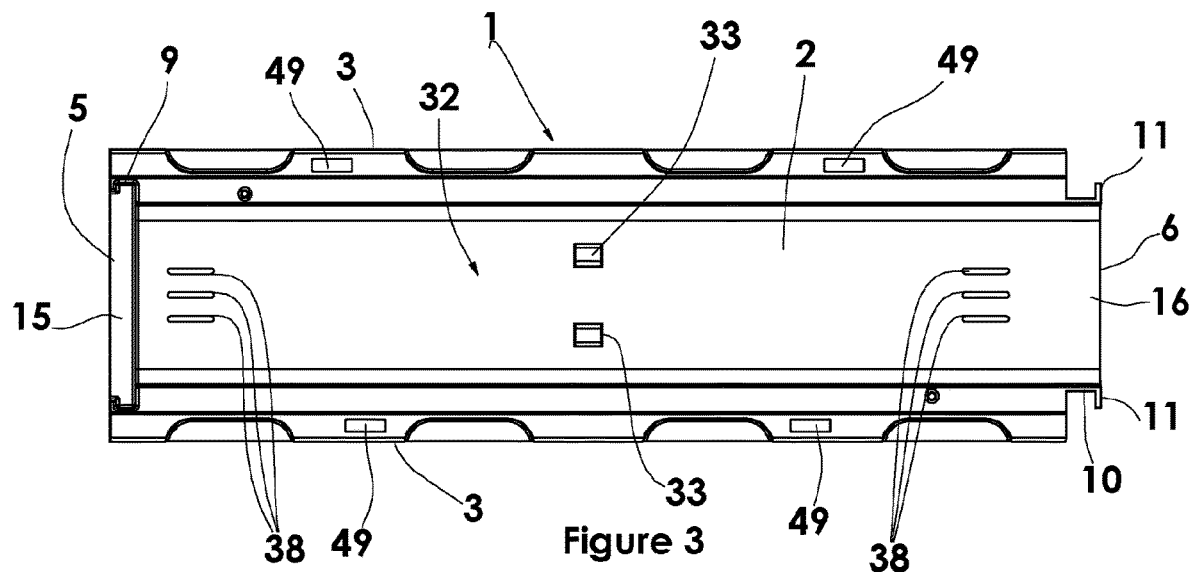
FIG. 3 is a plan view of the cable trough of FIGS. 1 and 2 without the divider.
Figure 4:
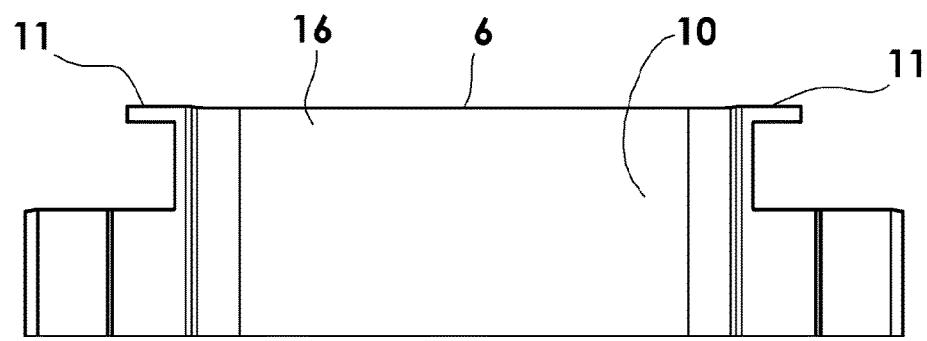
FIG. 4 is a plan view of one end of the cable trough of FIGS. 1-3 showing a male connector.
Figure 5:
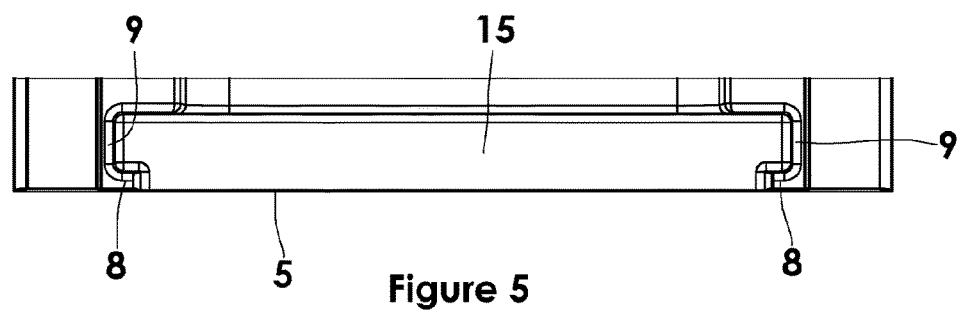
FIG. 5 is a plan view of the other end of the cable trough of FIGS. 1-3 showing a female connector.

The cable trough 1 is moulded from GRP (optionally comprising one or more fire retardant additives) and comprises an elongate, straight base 2, and two opposing sidewalls 3 that define a straight channel 4 from a first open end 5 to a second open end 6. Each open end is provided with a connector, 15, 16. The connectors of the cable trough 1 are one-way; that is to say, the first end 5 is provided with an integral female connector 15, whilst the second end 6 is provided with an integral male connector 16. The male connector is not designed to, or capable of, receiving another male connector and the female connector is not designed to, or capable of insertion into another female connector. The straight cable troughs 1 of this embodiment are about one metre in length (which is quite standard for existing cable troughs), and have an internal width (i.e. a width of the channel) of about 18 cm and an internal height of about 10 cm. These sizes are of course chosen simply as they are suitable, and those skilled in the art can alter the size as necessary.

The upper end of each sidewall 3 is rebated to receive a lid 40 (shown in FIGS. 23-28). Each sidewall 3 has a flat inside surface 53, but a corrugated outside surface 54. In consequence, the sidewalls have thicker regions and thinner regions. In the thinner regions, near the bottom, horizontally extending ribs 55 are integrally provided. These ribs serve two purposes; first, they act as ballast anchoring points—the cable troughs can be installed in trenches with their lids at ground level, and back-filled with ballast (e.g. stones). The ballast will thus sit atop the ribs 55 holding the troughs in place. Additionally, in view of their size (about 10 cm long, 2 cm deep and about 5 cm from the bottom of the cable trough 1), they can act as handles, to lift the cable troughs whilst they are sitting on the ground.

With reference to FIGS. 1-3 and 5, the female connector 15 at the first end 5 is formed by a recess 7 extending away from the inside surface of each sidewall 3 and the upper surface of the base 2; an inwardly extending flange 8 is provided at the extreme end of each recess 7 in each sidewall 2, so as to define a pair of opposing grooves 9 in inside surfaces of the sidewalls 2. The grooves 9 are open at the top to allow a male connector to be slid downward into them.

For its part, the male connector 16 at the second open end 6 (visible in FIGS. 1-4) is formed by a thin (e.g. 6 mm) projection 10 of the material of the inside surface of the base 2 and the side walls 3 of the cable trough 1, at its end 6. The projection 10 is sized to fit within the recess 7, such that the inner surface at the end of the base 2 and sidewalls 3 of the projection 10 abut the inner surface of the sidewalls 3 and base 2 of the first, female, end 5, so as to form a continuous channel 4 between cable troughs 1 when arranged end-to end.

The extreme end of the projection 10 of the male connector 16 is provided with an outwardly extending tongue 11, the tongue 11 extends outward (i.e. away from the longitudinal axis along the channel 4) from both sidewalls of the projection 10 and from its base.

The tongue 11 is suitably sized to extend to the recessed part of the first (female) end 5, and is thinner than the width of the grooves 9, so as to allow a certain amount of play, in order that the cable troughs 1 when arranged end-to-end need not be absolutely in-line. The connection between a male connector 16 and female connector 15 is shown in plan view in FIG. 6, in which the male connector 16 of a straight cable trough 1 of the type described above is connected to a T-shaped cable trough 12, or T-shaped junction, which has three open ends, each (in this embodiment) provided with a female connector 15, exactly the same as that at the first end 5 of the straight cable trough 1. Two ends are in line with each other, whilst a third end is orthogonal to the in-line ends, so as to form the T-shape.

Figure 6:
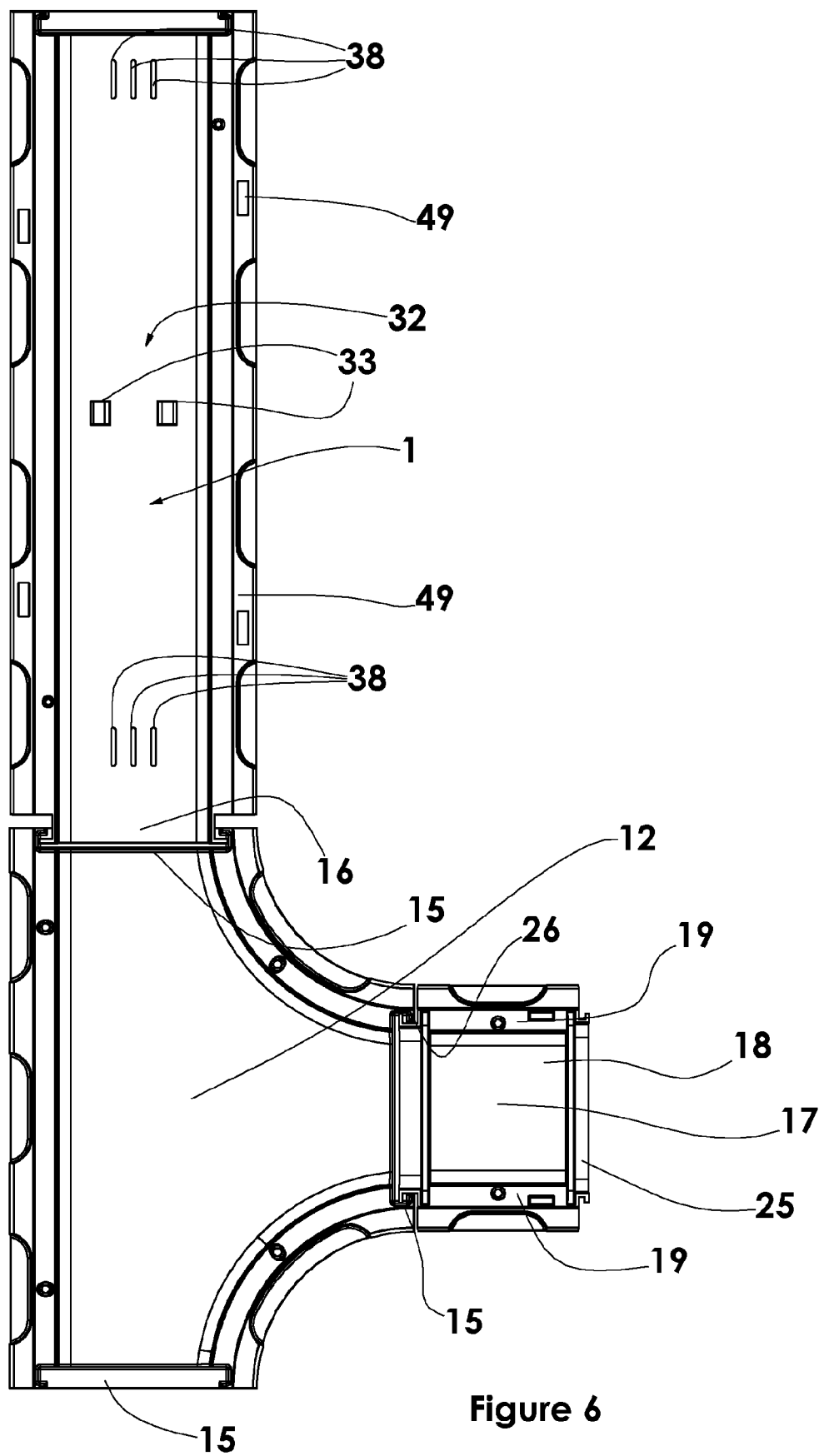
FIG. 6 is a plan view of the cable trough of FIG. 1 connected to a T-shaped cable trough, which in turn is connected to a cable trough adapter.
Figure 7:
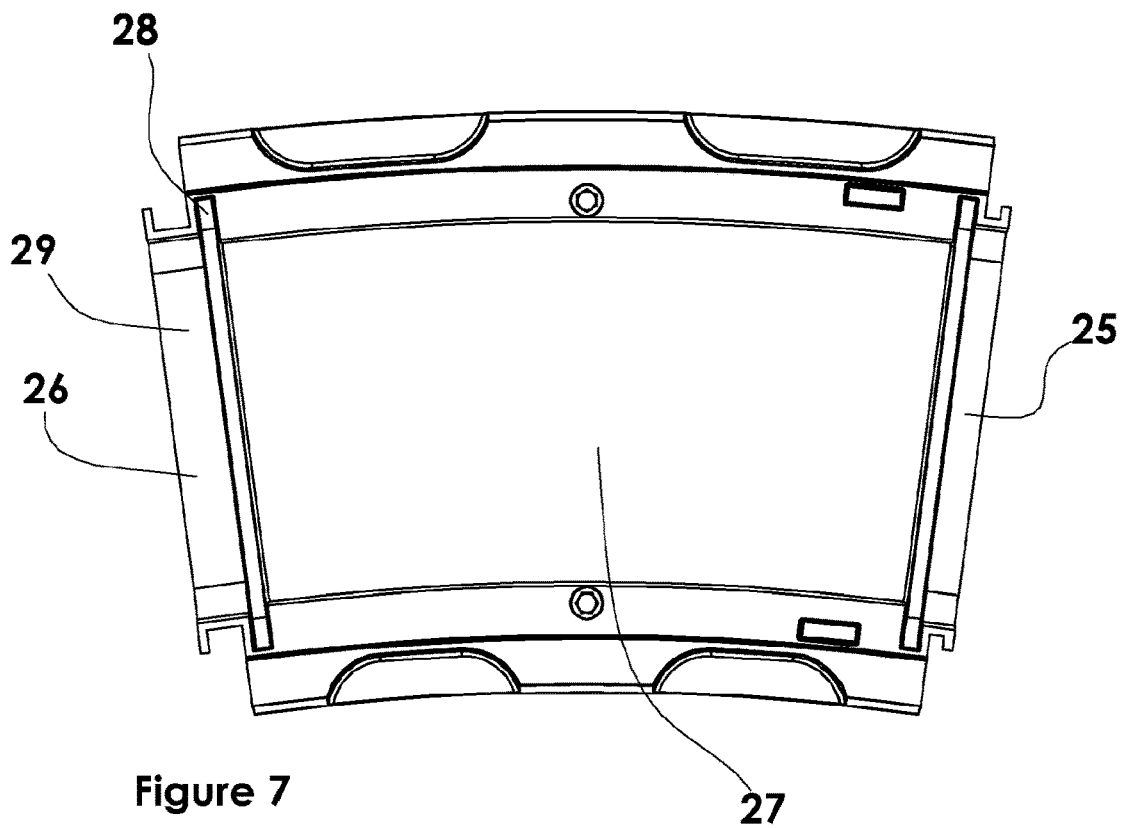
FIG. 7 is a plan view of a curved cable trough.

To effect connection of the straight cable trough 1 to the female connector 15 of the T-shaped cable trough 12, the T-shaped cable trough is placed flat on the ground and the second end 6 of the straight cable trough 1, where the male connector 16 is formed is lifted into the air and dropped down so that the tongue 11 sits in the grooves 9 in the female end 15. Of course, the identical technique is used to connect straight cable troughs 1 to each other end-to-end, and normally the bulk of a cable trough system consists of straight cable troughs connected end-to-end. The T-shaped troughs as shown in FIG. 6 will be typically used more sparingly.

Figure 20:
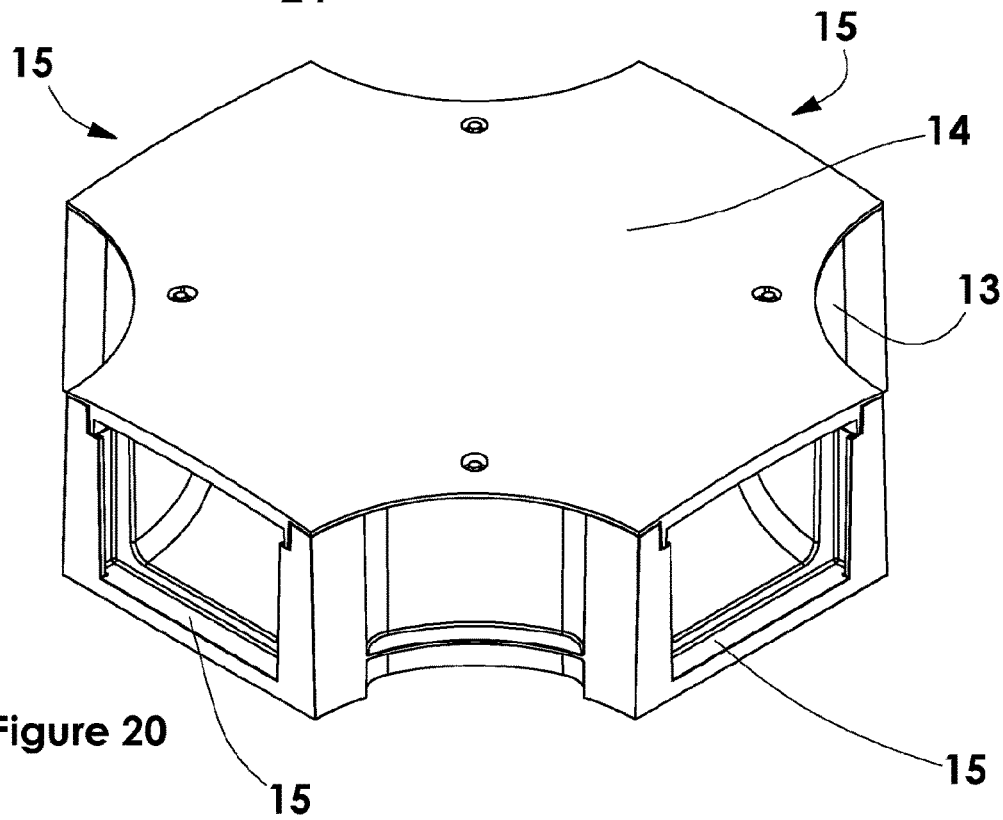
FIG. 20 shows a perspective view of a four-way junction box cable trough and its lid.

The invention also comprises cable troughs in the form of four-way junction boxes 13 (with corresponding lids 14), as shown in FIG. 20, which are provided with four orthogonal open ends, each comprising a female connector 15.

It is advantageous for the T-shaped troughs 12 and four-way junction boxes 13 to comprise female connectors, because that means that they can be left on the floor whilst the straight troughs 1, that make up the majority of a cable trough system are lifted up and inserted in to them. It will be appreciated that once a number of cable troughs 1 are attached to a T-shaped trough 12, or a four-way junction box 13, it could become difficult or impossible to lift it.

On the other hand, in a system consisting of only straight troughs 1 as described above, with a male connector 16 at one end and a female connector 15 at the other end, and T-shaped troughs 12, and four-way junction boxes both having only female connectors 15, there could be difficulty in producing extensive systems with several junctions. As will be appreciated, given that the T-shaped troughs 12 and four-way junction boxes 13 all have female connectors, the end of a trough system formed of straight troughs 1 extending away from these junctions 12, 13 will always end with a female connector 15. Thus, it would not be connectable to another junction 12, 13.

One solution would be to increase the inventory, for example to include cable troughs 1 with a male connector 16 at both ends. The present invention, however, includes a more elegant solution, based on multiway connectors, connectable to both a female connector 15 and a male connector 16. The multiway connectors are also provided on specialised cable troughs, in the form of adapters and wedges.

An adapter 17 is shown in FIG. 6, it is straight, but much shorter than the straight cable troughs 1, just 20 cm in length. The adapter 17 has the same ordinary features of the other cable troughs, including a base 18, and two sidewalls 19 to define a channel of the same size as channel 4 described above between two open ends. However, at one end it is provided with a female multiway connector 25 and at the other end it is provided with a male multiway connector 26.

Figure 11:
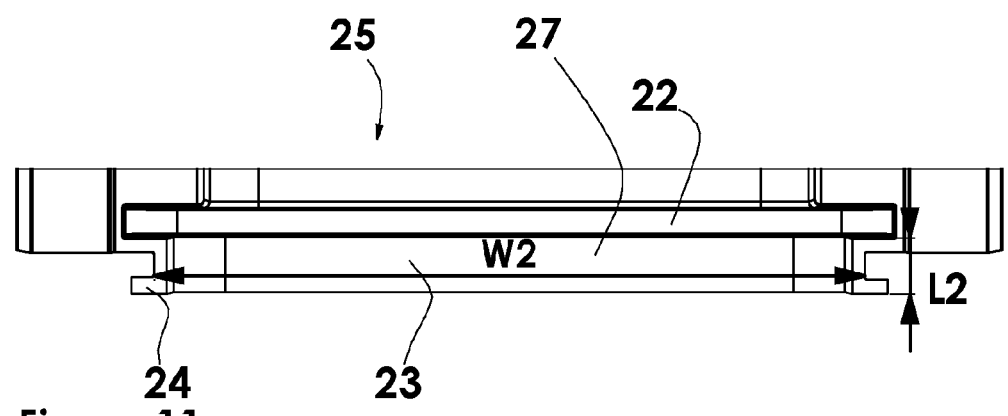
FIG. 11 is a plan view of the female multiway connector of the cable trough of FIG. 7.
Figure 19:
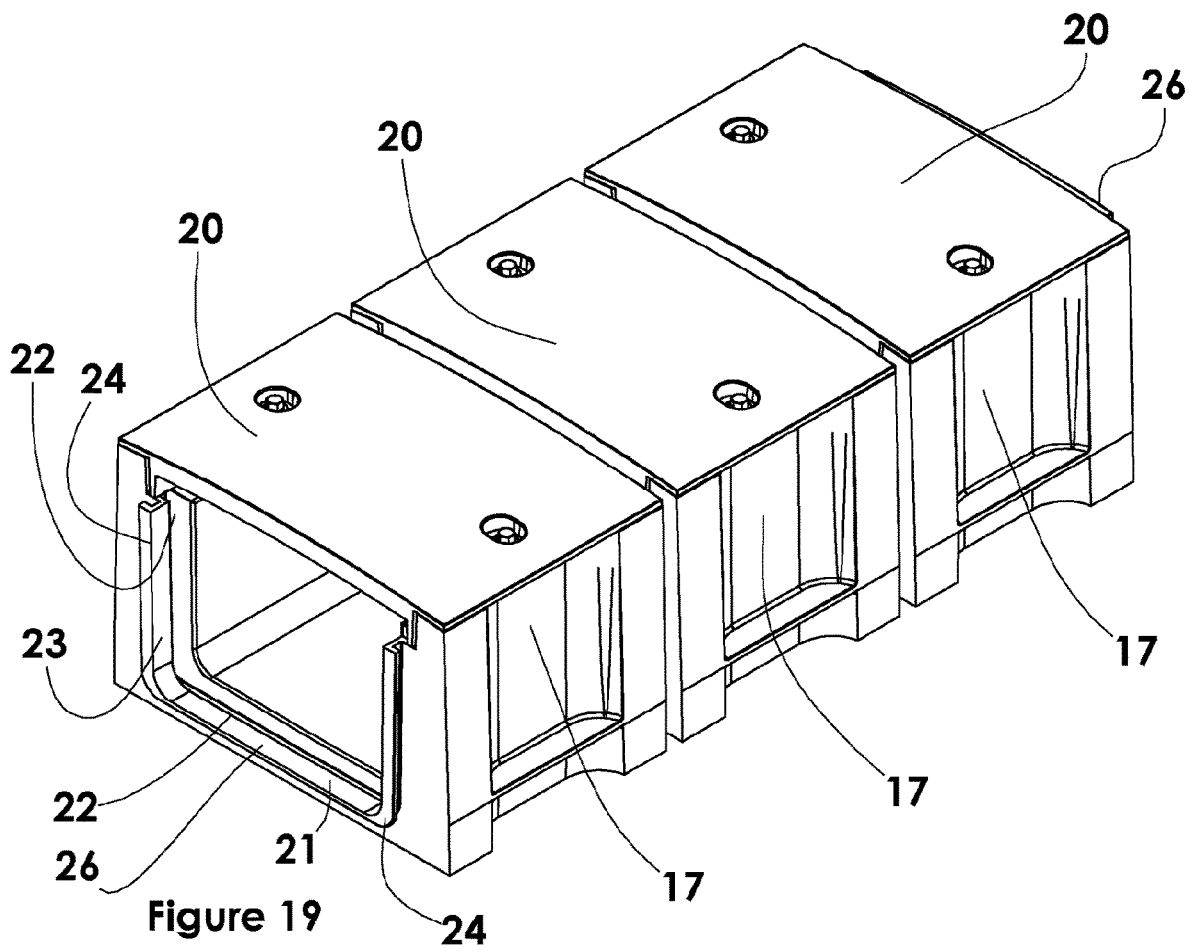
FIG. 19 shows a perspective view of three adapters of the type shown in FIG. 6 connected together, each having a lid thereon.

The construction of a female multiway connector 25 on an adapter 17 can be seen best in FIG. 19, which shows three adapters 17 connected end to end, each provided with a lid 20, and in FIG. 11. Like the female connector 15, the female multiway connector 25 includes a recessed region 21 at the end of the sidewalls 19 and base 18 of the adapter 17. At the interface of the recessed region 21 and the end of the sidewalls 19 and base 10, a groove 22 is formed in the recessed region 21. This groove 22 extends outwardly and has a depth from the inner surface of the sidewall and base equal to that of the recess 7 of the female connector 15. Accordingly, the tongue 11 of a male connector 16 can be seated into the groove 22 of the female multiway connector.

Figure 16:
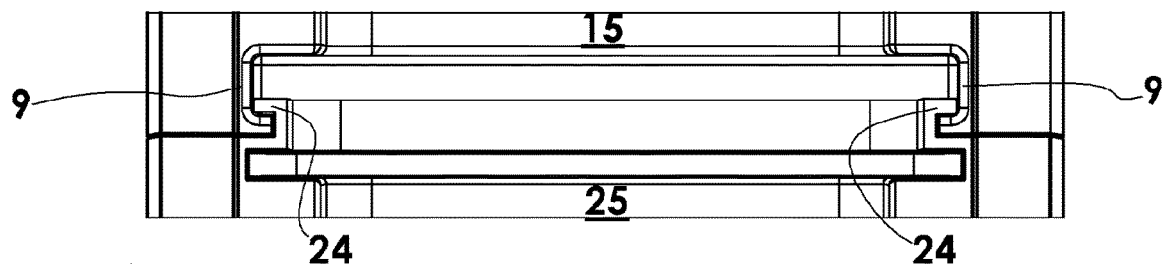
FIG. 16 shows a detailed plan view of the region of a connection between the female multiway connector of a cable trough according to FIG. 7 and the female connector of a cable trough according to FIG. 1.
Figure 18:
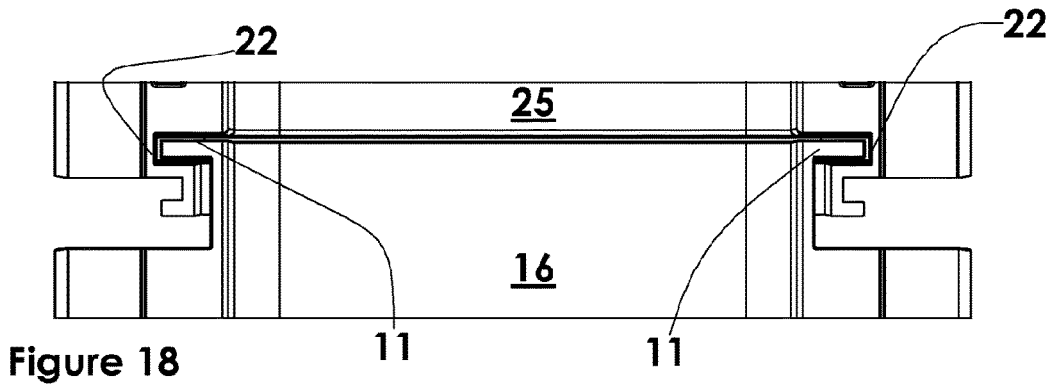
FIG. 18 shows a detailed plan view of the region of a connection between the female multiway connector of a cable trough according to FIG. 7 and the male connector of a cable trough according to FIG. 1.

Longitudinally outwardly of the groove 22, the female multiway connector 25 comprises a thin (e.g. 4 mm) projection 23 of the material of the cable trough 17, which at its extreme end comprises a tongue 24 extending outwardly from the sidewalls of the projection 23. The projection 23 of the female multiway connector is arranged further out (radially) than the projection 10 of the male connector 16 and slightly inward of the dimension of the recess 7 of the female connector 15. In consequence, as shown in FIG. 16, the female multiway connector 25 can be connected as if it were a male connector to a female connector 15, with the tongue 24 of the female multiway connector engaging in the grooves 9. Equally, the female multiway connector 25 can be connected as if it were a female connector to a male connector 16, as shown in FIG. 18. In this arrangement, the tongue 11 of the male connector 16 is seated in the groove 22 of the female multiway connector 25.

Figure 8:
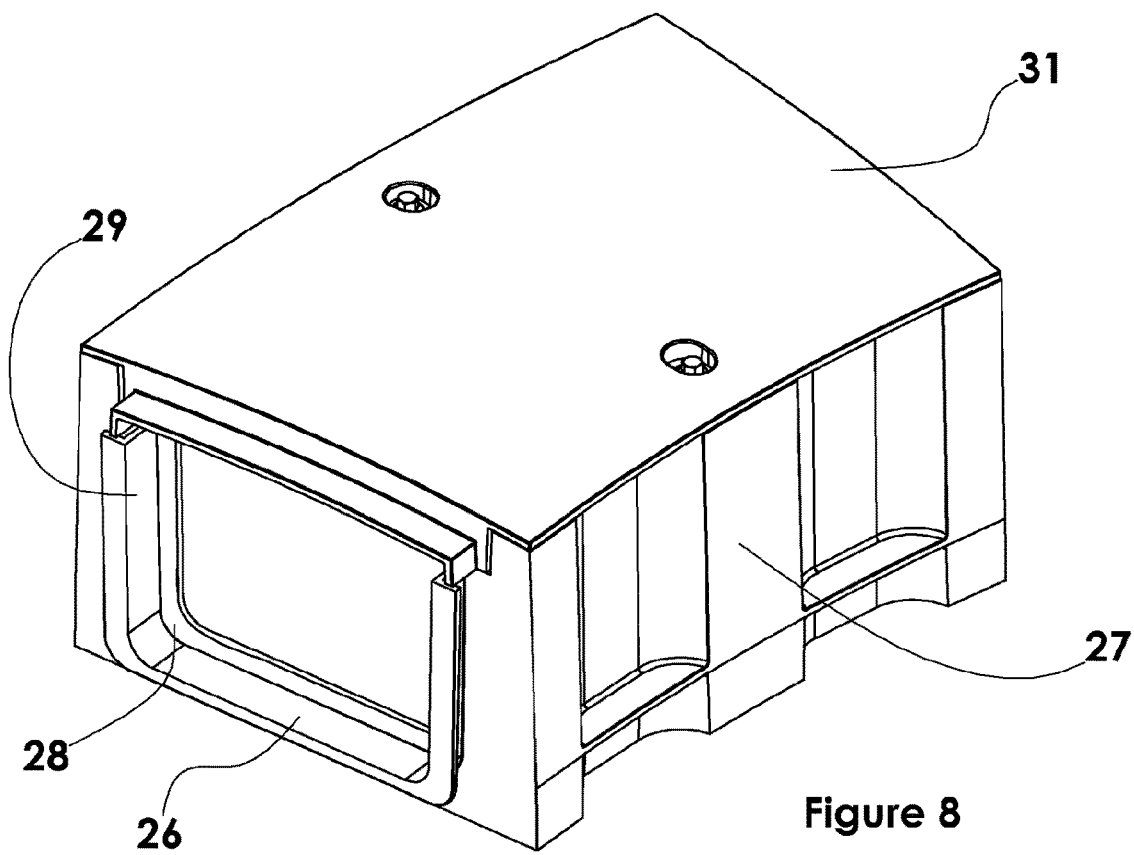
FIG. 8 is a perspective view of the cable trough of FIG. 7 with a lid thereon.
Figure 9:
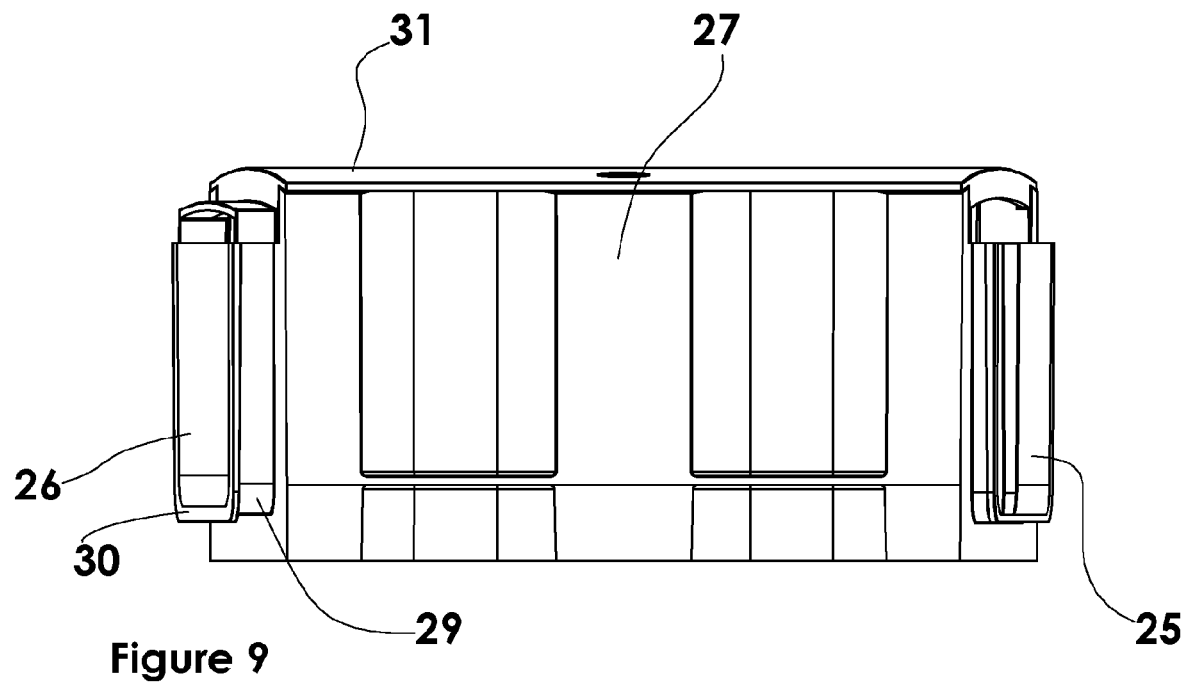
Figure 10:
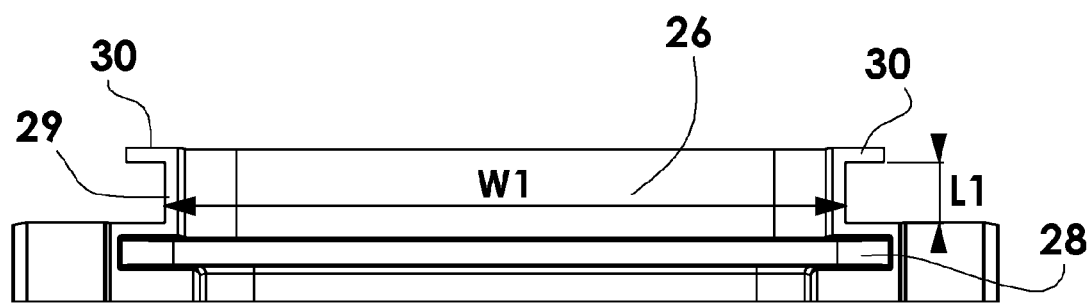
FIG. 10 is a plan view of the male multiway connector of the cable trough of FIG. 7.

As set out above, at the opposite end of the adapter 17 of FIGS. 6 and 19, a male multiway connector 26 is formed. Identical male multiway connectors 26 (and female multiway connectors 25) are also provided on curved cable troughs 27 shown in FIGS. 7-9 and 12-14. These curved cable troughs 27 are approximately 45 cm at their longest, and curve about a radius of 15 degrees from one end to the other they are provided with lids 31 (visible in FIG. 8). The fact that they too have multiway connectors 25, 26 means they can be connected at either end to a straight cable trough 1 (or indeed one of the junctions 12, 13), so that a curve can be produced in either direction.

Turning back to the construction of the male multiway connector 26 that is found on the curved cable troughs 27 and the adapters 17, and with particular reference to FIGS. 7, 8, 9 and 10, the male multiway connector 26 comprises a groove 28 in its base and sidewalls at the end of the cable trough 27. The groove 28 is equal in depth (from the upper side of the base and inside of the sidewalls) to the depth of the recess 7 of the female connector 15. The groove 28 has a width slightly larger than that of the tongue 11 of the male connector 16.

Figure 17:
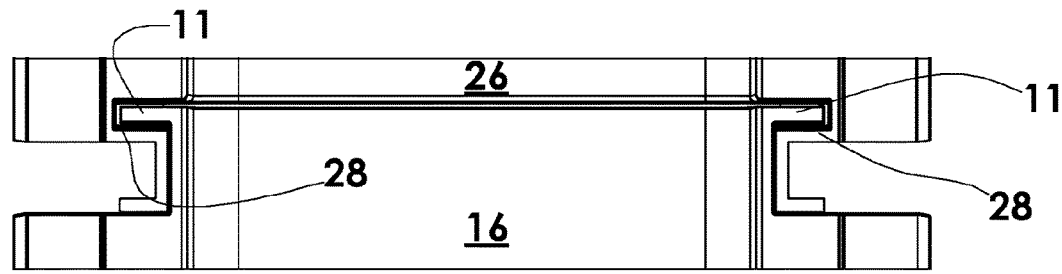
FIG. 17 shows a detailed plan view of the region of a connection between the male multiway connector of a cable trough according to FIG. 7 and the male connector of a cable trough according to FIG. 1.

In consequence, as shown in FIG. 17, the male connector 16 can be connected to the male multiway connector 26 by means of that tongue 11 and groove 28. At the outer end of the groove 28, the male multiway connector 26 has a thin (e.g. 4 mm) projection 29 of the material of the cable trough 26, 17.

Figure 15:
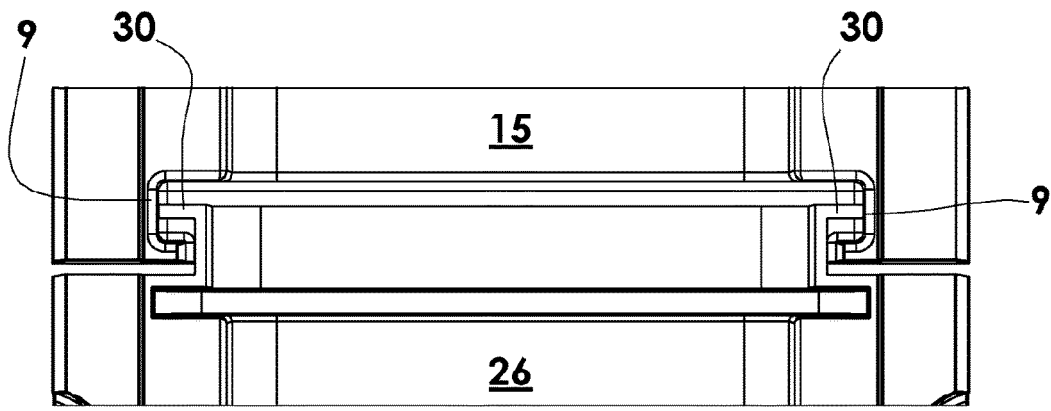
FIG. 15 shows a detailed plan view of the region of a connection between the male multiway connector of a cable trough according to FIG. 7 and the female connector of a cable trough according to FIG. 1.

This thin projection 29 is provided at its extreme end with an outwardly extending tongue 30, which extends from both the sidewalls and the base of the projection 29. The tongue 30 extends to about the same depth as the recess 7 in the female connector 15, thus, as shown in FIG. 15, the male multiway connector 26 can be connected to the female connector 15 by means of that tongue 30 and the grooves 9 in the female connector 15.

The length and width of the thin projection 29 of the male multiway connector 26 is carefully designed to allow it also to mate with the female multiway connector 25.

Figure 12:
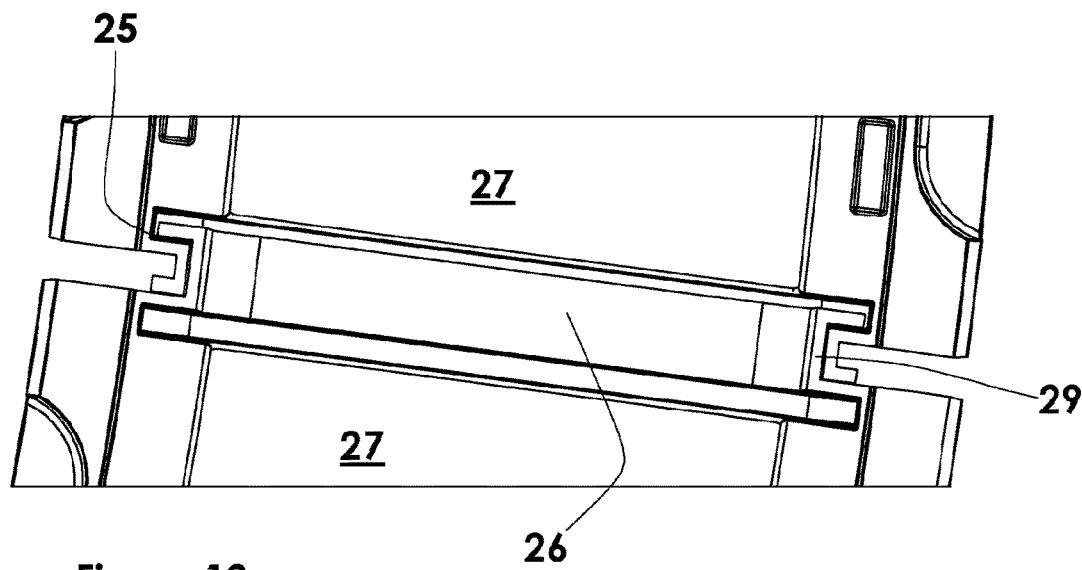
FIG. 12 is a plan view showing the male multiway connector of a cable trough according to FIG. 7 connected to the female connector of a cable trough according to FIG. 7.

To be precise, as shown in FIG. 12, the projection 29 of the male multiway connector 26 has a length L1 (see FIG. 10) measured from the end of the body of the cable trough 17, 27 to the start (i.e. the innermost part) of the tongue 30 (comparable to an inside leg measurement), which is slightly greater than the length L2 (see FIG. 11) of the projection 23 of the female multiway connector measured from its groove 22 to the distal end of its tongue 24. Similarly, the width W1 (see FIG. 10) of the projection 29 of the male multiway connector 26 measured between the outside edges of the sidewalls of the projection 29 is slightly smaller than the width W2 (see FIG. 11) of the projection 23 of the female multiway connector 25 measured between the inside edges of its sidewalls.

Likewise, with the base of each cable trough 26, 17 on the floor, the underside of the base of the projection 29 of the male multiway connector is arranged just above the upper side of the base of the projection 23 of the female connector. This can be seen in FIG. 9.

Thus, in terms of width: the width of the female connector 15 measured between the inside edges of the recess is slightly greater than (or optionally equal to) the width of the female multiway connector 25 measured between the outside edges of its projection 23; the width of the female multiway connector 25 measured between the inside edges of its projection 23 is slightly wider than (or optionally equal to) the width of the male multiway connector 26 measured between the outside edges of its projection 29; and the width of the male multiway connector 26 measured between the inside edges of its projection 29 is slightly wider than (or optionally equal to) the width of the male connector measured between the outside edges of its projection 10. If equal, a transition fit can be obtained, providing good stability, otherwise, with a slightly larger dimension, ease of fitting is obtained.

And, in terms of length: the length of the female connector 15 beyond which the tongues 11, 24, 30 must extend for connection (i.e. the width of the flange 8) is slightly less than (or optionally equal to) the length of the female multiway connector 25 measured between the body of the connector and the start of the tongue 24; the length of the female multiway connector 25 measured between the groove 22 and the distal end of its tongue 24 (L2) is slightly less than (or optionally equal to) the length of the male multiway connector 26 measured from the end of the body of the trough 17, 27, to the start of the tongue 30 (L1); and the length of the male multiway connector 26 measured between the groove 28 and the distal end of the tongue 30 is slightly less than (or optionally equal to) the length of the male connector measured between the body of the cable trough 1 and the start of the tongue 11. If equal, a transition fit can be obtained, providing good stability, otherwise, with a slightly larger dimension, ease of fitting is obtained.

The dimension from the base of the respective cable trough 1, 13, 14, 17, 27 to the base of the recess 7, and the projections 23, 29, 10 are similarly sized, such that the fit is like that of a Russian doll, with the spacing smallest for base to the recess 7 of the female connector 15, larger for the base to the projection 23 of the female multiway connector 25, larger still for the base to the projection 29 of male multiway connector 26 and largest for the base to the projection 10 of the male connector 16.

In this specific example, the width of the female connector 15 measured between the inside edges of the recess is 235.5 mm; the width of the female multiway connector 25 measured between the outside edges of its projection 23 is 221 mm; the width of the female multiway connector 25 measured between the inside edges of its projection is 213 mm; the width of the male multiway connector 26 measured between the outside edges of its projection 29 is 211.5 mm; the width of the male multiway connector 26 measured between the inside edges of its projection 29 is 203.5 mm; and the width of the male connector measured between the outside edges of its projection 10 is 202 mm.

And, in terms of length in this specific example: the length of the female connector 15 beyond which the tongues 11, 24, 30 must extend for connection (i.e. the width of the flange 8) is 6.1 mm; the length of the female multiway connector 25 measured between the body of the connector and the start of the tongue 24 is 7.7 mm; the length of the female multiway connector 25 measured between the groove 22 and the distal end of its tongue 24 (L2) is 17.4 mm; the length of the male multiway connector 26 measured from the end of the body of the trough 17, 27, to the start of the tongue 30 (L1) is 18.2 mm; the length of the male multiway connector 26 measured between the groove 28 and the distal end of the tongue 30 is 27.9 mm; and the length of the male connector measured between the body of the cable trough 1 and the start of the tongue 11 is 30 mm. If equal, a transition fit can be obtained, providing good stability, otherwise, with a slightly larger dimension, ease of fitting is obtained.

The dimension from the underside of the base to the recess 7 of the female connector 15 is 19.5 mm, the dimension from the underside of the base to the projection 23 of the female multiway connector 25 is 19.9 mm; the dimension from the underside of the base to the projection 29 of male multiway connector 26 is 24.5 mm; and the dimension from the underside of the base to the projection 10 of the male connector 16 is 29 mm.

In this particular embodiment the tongue 11 of the male connector 15 is 6 mm thick, the tongues 24, 30 of the male multiway connector and the female multiway connector are 5.3 mm thick, and the width of the grooves 9 in the female connector is 21 mm.

The width of the tongues 11, 30 of the male connector 16 and the male multiway connector 26 from their tips, laterally across the cable trough is 235.5 mm, and width across the cable trough between the tips of the tongue 24 of the female multiway connector is 235 mm, thus corresponding to the width between the grooves 9.

Figure 13:
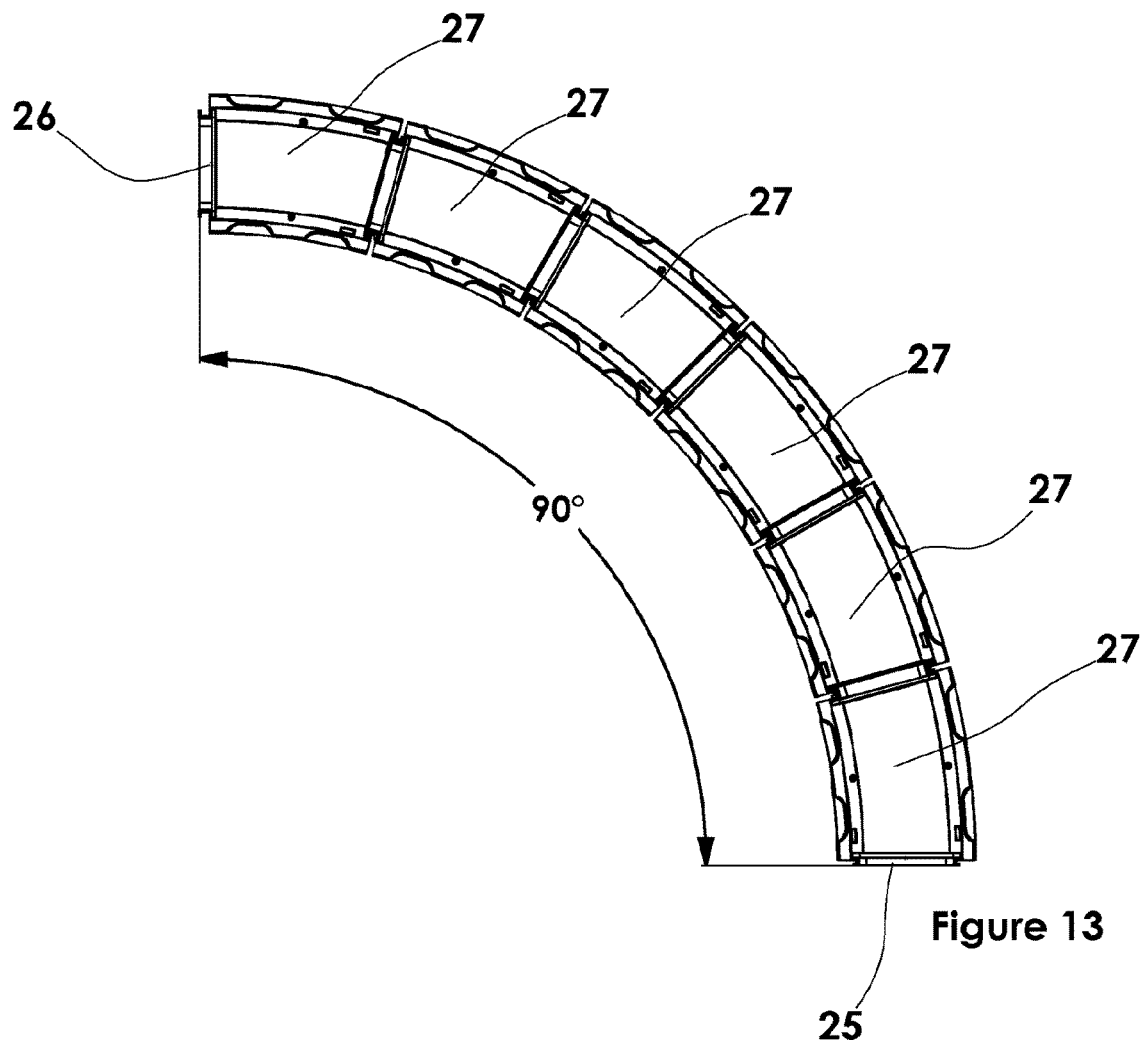
FIG. 13 shows a plan view of a series of six cable troughs according to FIG. 7 connected so as to form a 90-degree bend in part of a cable trough system.

As shown in FIG. 13, this arrangement whereby curved cable troughs 27 are provided with male multiway connectors 16 and female multiway connectors 15 at their open ends, means that gentle curves suitable for thick cables can be introduced into a cable system (with a 15 degree curve in each curved cable trough 27, six curved cable troughs form a 90 degree bend. Since both ends of the curved part of the system terminate with a male or female multiway connector 15, 16, either end of the curve can be connected to either end of a straight cable trough 1.

Figure 14:
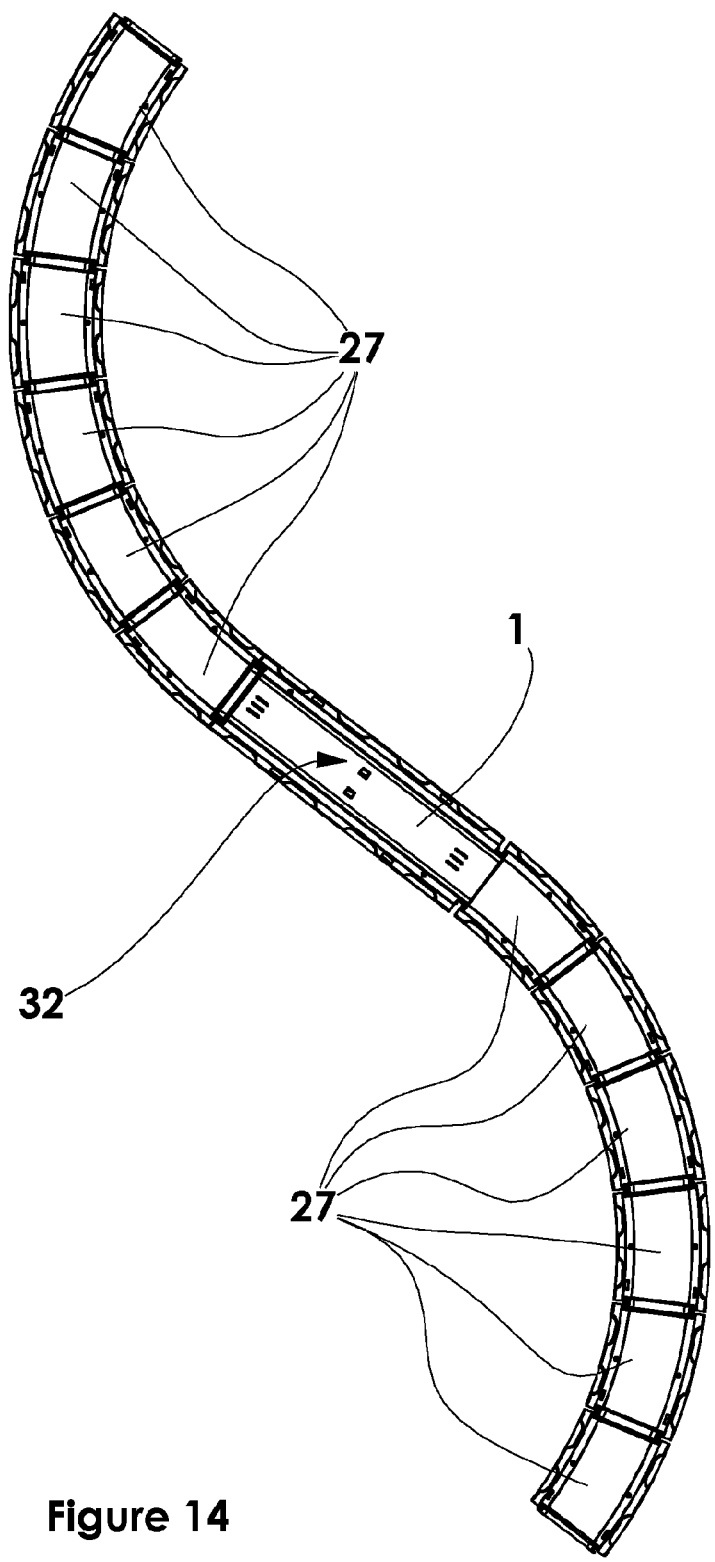
FIG. 14 shows a plan view of a cable trough of FIG. 1 connected at each end to a series of five cable troughs according to FIG. 7.

As shown in FIG. 14, the curved cable troughs 17 with male and female multiway connectors 15, 16 can curve in either direction from a straight cable trough 1, because either end of a curved cable trough 17 can be connected to either end of a straight cable trough. Whilst the curved cable troughs 17 cannot be connected directly to each other in opposite directions (as that would involve either a male-multiway to male-multiway connection, or female-multiway to female-multiway connection), a straight cable trough 1 (which can be connected at either end to either end of a curved cable trough 27) can be interjected, to form a curve in one direction and back again, to avoid an obstacle.

Figure 21:
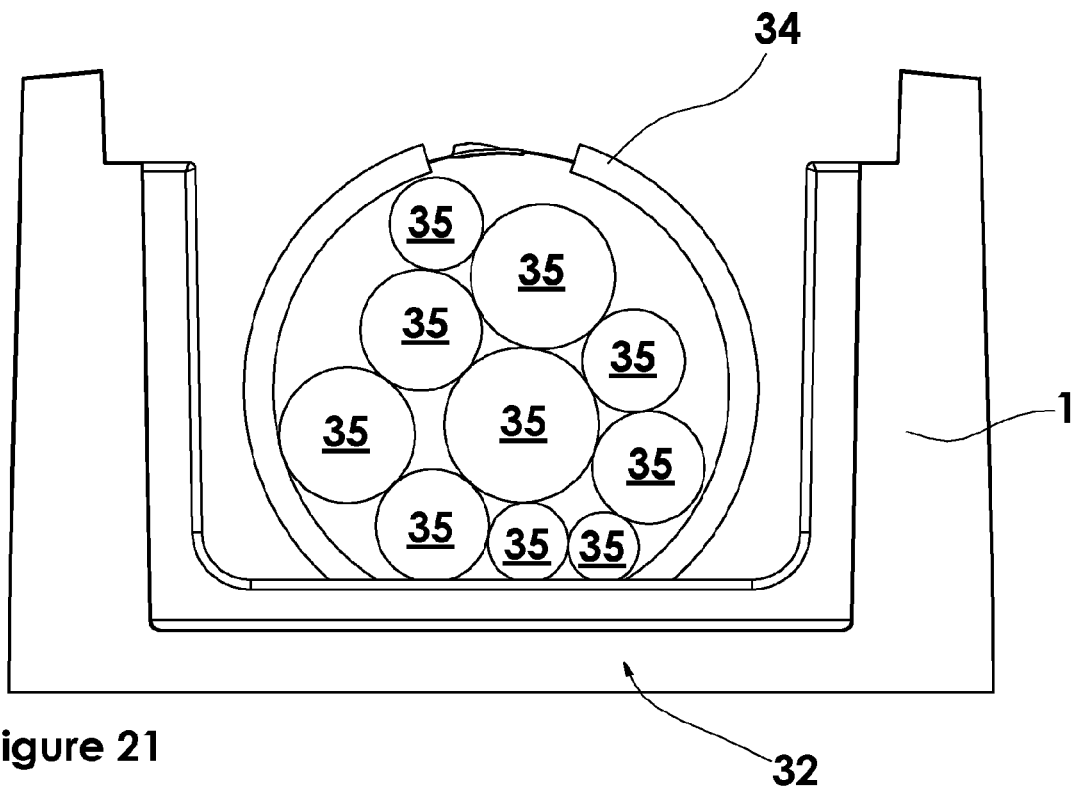
FIG. 21 shows a lateral cross section through the cable trough of FIG. 1 showing a cable tidy and some cables.
Figure 22:
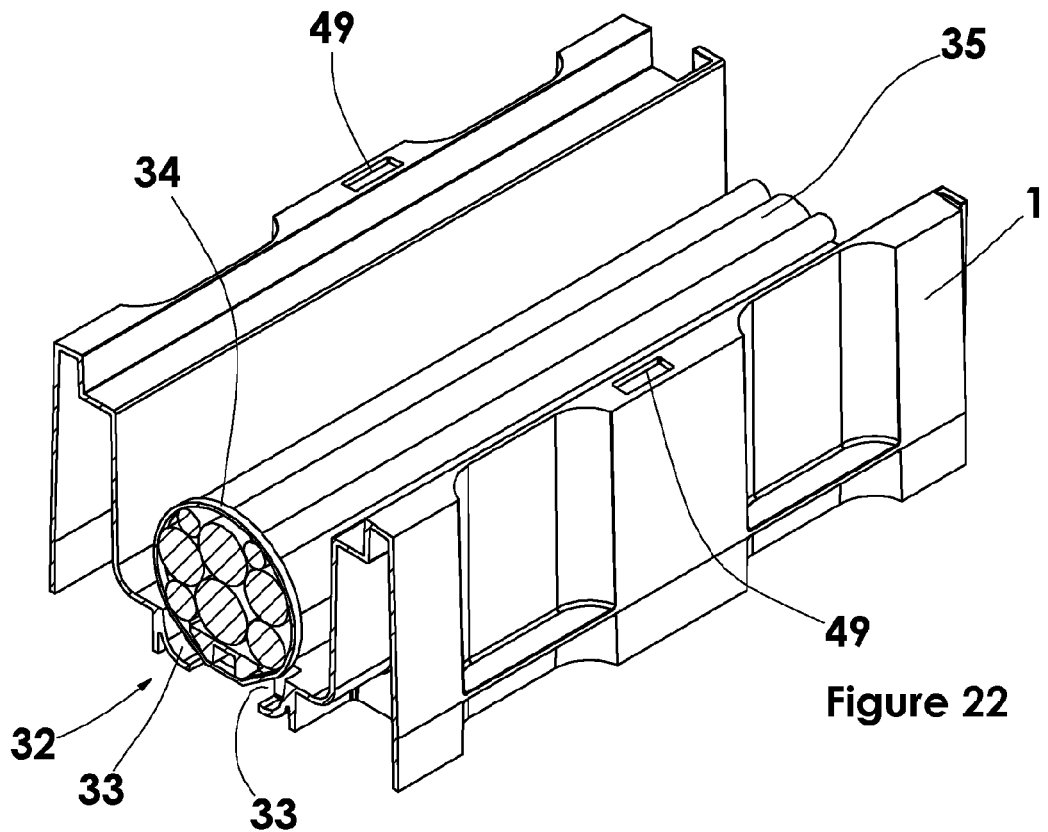
FIG. 22 shows an isometric cross section through the cable trough of FIG. 21 in the region of the connection between the cable tidy and the trough.
Figure 23:
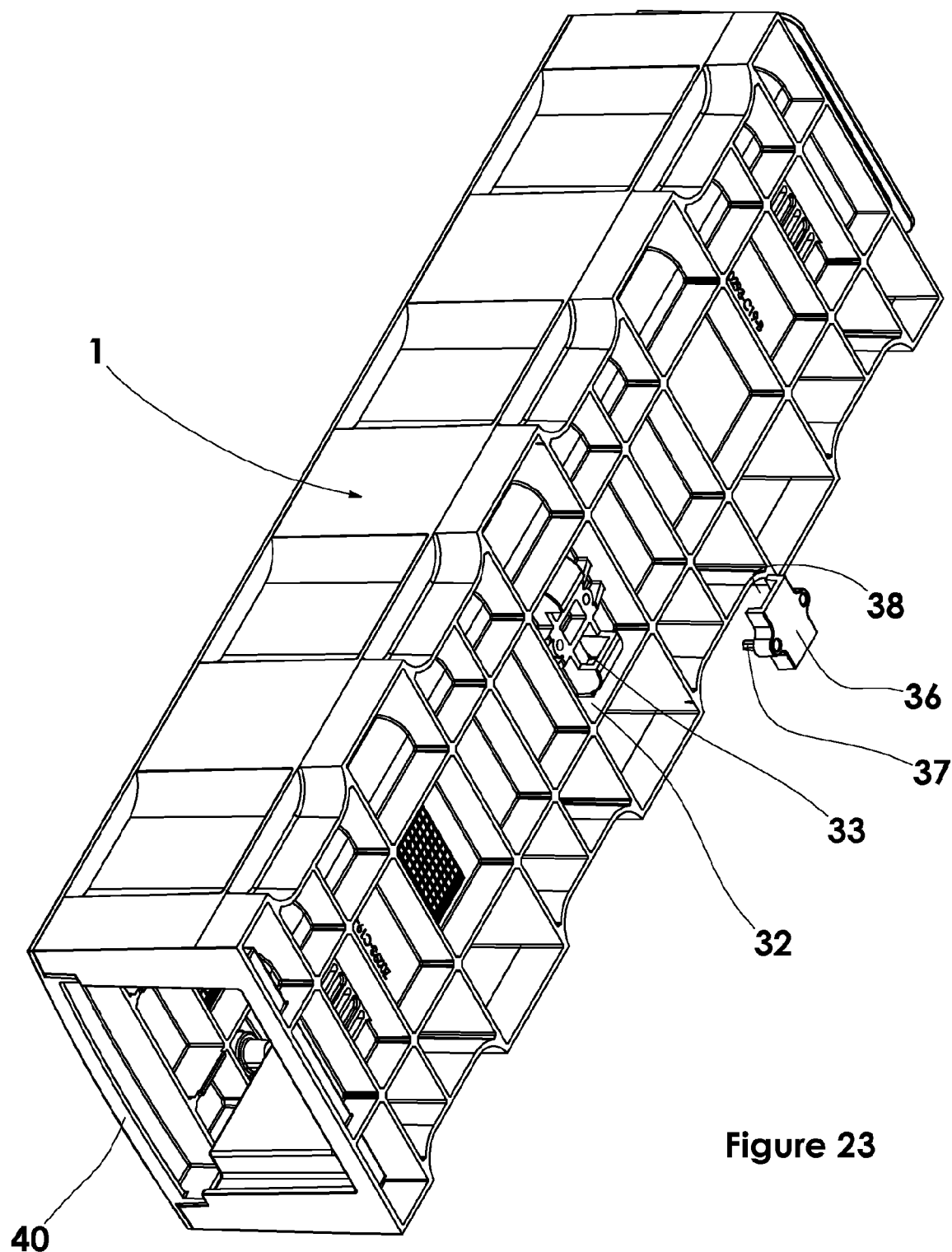
FIG. 23 shows an isometric underneath view of the cable trough of FIGS. 21 and 22 with a guide shown detached.

The cable troughs 1 of the invention are provided with a number of additional features, in particular, each straight cable trough 1 (and optionally the other cable troughs 12, 13, 17, 27) is provided with a cable retention arrangement 32 shown in detail in FIGS. 21 to 23 and also visible in FIGS. 2, 3, 6 and 14. The cable retention arrangement 32 includes a cable tie retention system in the form of two apertures 33 through the base 2, which are moulded into the cable trough 1. The apertures 33 are arranged either side of a centreline of the trough (i.e. the line half way between the sidewalls 3) and in the present embodiment around the middle of the base 2 (half way between the open ends 5, 6.

The apertures 33 are intended to receive a cable tie 34 used to secure a bundle of cables 35. As best seen in FIGS. 22 and 23, the apertures 33 are angled so as to guide the cable tie 34 towards the centreline of the trough 1, below its base 3, each aperture 33 being curved from an entrance at the upper surface of the base to an exit orthogonal to the entrance and below the upper surface of the base to guide the cable tie 34. The cable tie securing system further comprises a guide 36 arranged beneath the base 3 of the cable trough 1 to guide the cable tie 34 from one aperture 33 to the other aperture 33. The guide 36 takes the form of a cover, which is attached via fasteners 37 to the underside of the trough 1. The guide has a channel 38 which lines up with the exits of each aperture 33 at the base 2, which face each other, so as to form a smooth path between the entrances of the apertures 33 in the upper side of the base 2. This system allows a cable tie 34 to be fitted through the apertures 33 to secure the cables 35 to the cable trough 1 itself, not to an accessory attached to the cable trough 1. This is a particularly secure manner of attachment.

Another particular additional feature of the straight cable trough 1 (which could be applied to any of the other cable troughs 12, 13, 17, 27) is three pairs of slots 38 arranged in the base, which are capable of allowing drainage and receiving a cable divider 39 (visible in FIGS. 1 and 2). Each pair of slots 38 consists of one slot arranged towards one end 5 and one slot arranged towards the other end 6 of the trough 1. The slots 38 are elongate and their elongate axis is aligned with the axis between the two ends 5, 6 of the cable trough 1 and arranged such that one pair is central (i.e. on the centreline) and the others are either side of the central pair. In this manner, as shown in FIGS. 1 and 2, the central slots 38 can receive a divider 39 and there remain a pair of slots 38 on both sides of the divider 39 through which water can drain. Alternatively, the divider 39 could be arranged asymmetrically in one of the pairs of slots 38 that are to the side of the central pair, to separate a smaller bundle of cables 35 from a larger bundle of cables 35.

The lids 14, 20, 31, 40, of the four-way junction box 13, the adapter 17, the curved cable trough 27 and the straight cable trough 1, as well as the lid (not shown) of the T-shaped junction 12 can all be provided with certain features described below in relation to the lid 40 of the straight cable trough 1 shown in detail in FIGS. 24-28.

Each lid 40 has a domed upper surface 41 to aid water run-off. Each lid is moulded to have a main body 42 which sits at its sides in the rebate in the sidewalls 3, and a rim 43 extending from the top of the main body 42. The thickness of the main body 42 is provided by a series of ribs 45 running along the length and across the body, dividing its underside into cells 44. In this particular embodiment, two ribs 45 form sidewalls of the main body 42 and two further strengthening ribs 45 run longitudinally along the body parallel to the sidewalls about halfway between a respective sidewall and the centreline of the lid 40. Two ribs 45 at the ends of the lid 40 along with fourteen strengthening ribs 45 spaced between the ends divide the underside of the lid 40 into a total of forty-five cells 44. As shown in FIG. 24, enlarged in the magnified part, and shown in FIG. 26 and magnified in FIG. 27, each of the two longitudinally extending strengthening ribs 45 is provided on its underside with three pairs of feet 46. One pair of feet 46 is provided at the middle of the lid 40 and two pairs of feet 46 are provided near the ends. Each foot 46 is provided as a downwardly extending extension of the rib 45 in the region concerned and each foot 46 in this embodiment has a length of about 45 mm, a width of about 4.5 mm and a depth of about 3 mm.

Figure 26:
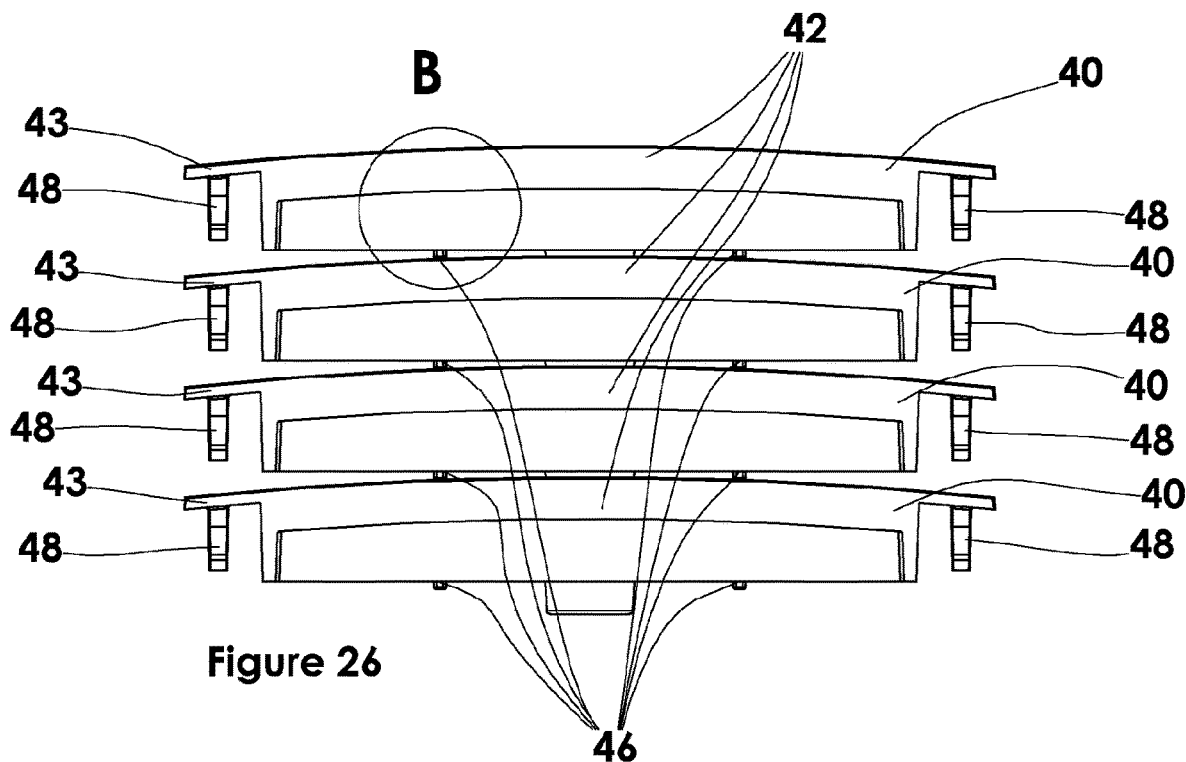
FIG. 26 is a lateral cross section through the stacked lids of FIG. 25.
Figure 27:
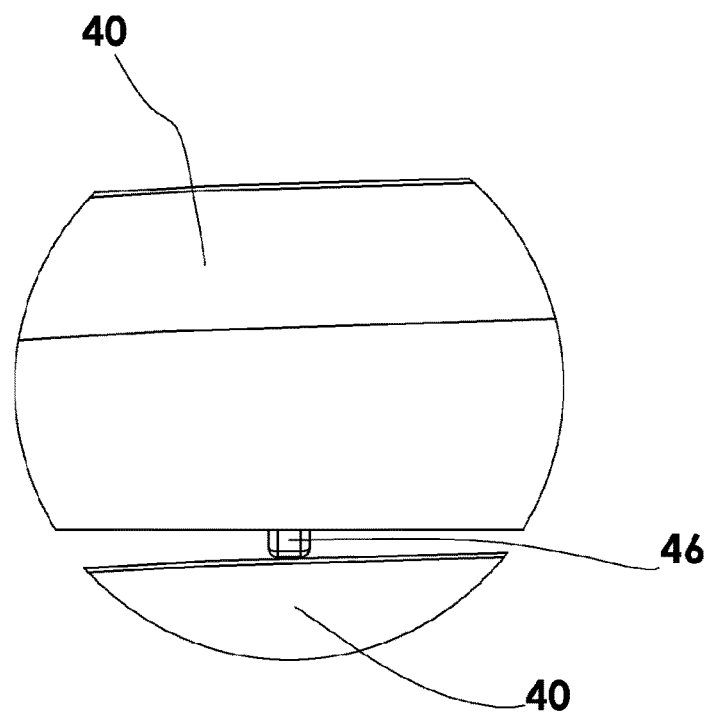
FIG. 27 is an enlarged view of the area labelled "B" in FIG. 26.
Figure 28:
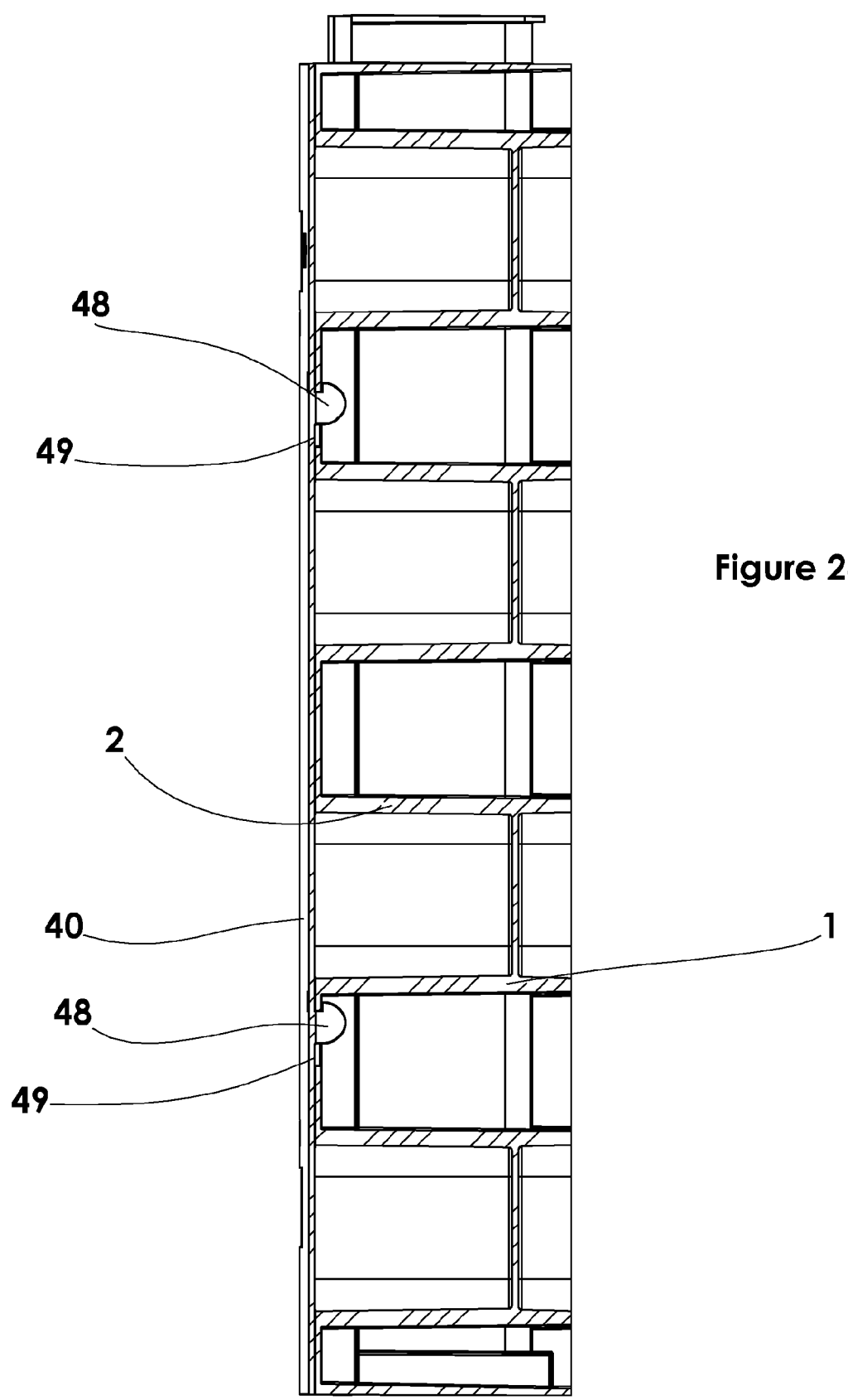
FIG. 28 is a cross section through the sidewall of a cable trough of FIG. 1 connected to a lid of FIG. 24.

The purpose of the feet 46, as can be seen in FIGS. 26 and 27, is, when lids 40 are stacked for transport, to contact the domed surface 41 of the lid 40 below either side of the centreline, so that a stack of lids 40 sit stably one upon another. This means that the lids 40 can be vertically stacked for transportation for maximisation of pallet quantities, and tension-strapped without collapsing.

The lids 40 are also provided with connection means 47 for connecting to the sidewalls 3 of a cable trough 1. The connection means take the form of so-called "duck's feet" 48, arranged to be inserted into longitudinally extending slots 49 (see FIGS. 1-3 and 28) through the upper surface of the sidewalls 2 and engage underneath the upper surface.

The duck's feet 48 extend downwardly from the underside of each rim 43, two on each side. The duck's feet on one side are offset relative to the nearest duck's foot on the opposite side, with the slots 39 having corresponding offsets. This ensures that the lid can only be positioned in the correct orientation. Each duck's foot 48 has a semi-circular head, which is longer than the leg from which it depends. In consequence, a notch is formed between the head of the duck's foot 48 and the rim 43. Accordingly, as the lid 40 is placed onto the cable trough 1, the duck's feet 48 slide into their respective slots 49, as the body 42 is seated in the rebate in the sidewalls 2, then, they are engaged under the upper surface of the sidewalls 2 by sliding the lid 40 longitudinally, i.e. in line with the centreline, such that the upper surface of the sidewall adjacent the slot 49 engages with the notch. The connection means allows the lid 40 to be kept shut before it is fastened in place using conventional fastening means. Various fastening means are known in the art, such as bolts or screws arranged in suitable apertures 50 through the lid 40 to engage with the cable trough 1.

It may be noted that each of the lids 40 is provided with a prolongation 51 at one end. With correct orientation, where straight cable troughs 1 are arranged end-to-end, the prolongation 51 will slide into a corresponding pocket 52 in the adjacent lid (underneath the upper surface 41 of the lid 40). This makes it more difficult for a would-be-thief to open the lids, since they are all interlocked. The prolongations 51 are intended to sit above the male connectors 16, so the lids of the junctions 12, 13, are provided with corresponding pockets in their lids, above each female connector 15.

In use, a cable system can be formed by connecting cable troughs 1 end-to-end by laying down a cable trough 1 (typically adjacent cable intended to be laid therein) with its female connector 15 available for connection, then introducing the male connector 16 of another cable trough 1 into the female connector 15 of the initial cable trough, and continuing this process as necessary.

If it becomes necessary to introduce a three-way junction 12, or a four-way junction 13, an adapter 17 can be used, such that either its male multiway connector 26, or its female multiway connector 25 is engaged with the female connector 15 of the cable trough 1 at one end, and the other of tis male multiway connector 26 or female multiway connector 25 is engaged with the female connector 15 of the junction 12, 13. Up to five adaptors 17 can be used to create a length of 20, 40, 60, 80 or 100 mm from the last cable trough 1 to the junction 12, 13.

If it is necessary to turn a corner and the cables 35 are too thick for the use of a junction box, or it is necessary to divert the path somewhat, either the male multiway connector 26 or the female multiway connector 25 of a curved cable trough 27 can be slid into the female connector 15 of a cable trough 1 to introduce a bend, and once the bend has turned sufficiently, the male connector 15 of a straight cable trough 1 can be introduced down into whichever of the male multiway connector 26 or female multiway connector 25 is at the terminal curved cable trough 27 and the installation of the cable trough system can continue as described above, with the male connector 16 of one cable trough 1 being introduced into the available female connector 15 of the last cable trough 1.

As the cable trough system is being built up, the cables 35 can be lifted from alongside the troughs 1, 12, 13, 17, 27 and placed into them (if desired, either side of a divider 39 placed in appropriate slots 38). Then, a cable tie 34 (in particular a reinforced cable tie 34) can be threaded into one of the entrances to one of the apertures 33, whereby it will be guided out of the entrance to the other aperture 33, and can be wrapped round the bundle of cables 35 and secured to its opposite end. Obviously, this need not take place in every cable trough 1, but can be done as desired by the installer, in accordance with the risk of theft.

With the cables 35 arranged in the cable trough system, the lids 14, 20, 31, 40, of any of the four-way junction box 13, the adapter 17, the curved cable trough 27 and the straight cable trough 1, as well as the lid (not shown) of the T-shaped junction 12, if those types of cable trough are used, can be put onto the respective cable trough 1, 12, 13, 17, 27, such that the duck's feet 48 (if present) extend into corresponding slots 49 and slid longitudinally into engagement. This also causes the prolongation 51 to slide into a corresponding pocket 52 in the adjacent lid. The lids can then be bolted/screwed shut by inserting suitable fasteners through the apertures 50 into the upper surface of the sidewalls 2 of the cable trough below.

The above embodiment is described by way of example only. Many variations are possible without departing from the scope of the invention as defined in the appended claims.

The invention claimed is:

1. A cable trough having a base, a plurality of sidewalls, a first open end and a second open end, each open end arranged for connection to the open end of another cable trough to form a cable trough system; wherein both the first open end and the second open end are provided with a multiway connector, the multiway connectors each comprising both a groove to receive the tongue of another cable trough and a tongue for insertion into the groove of another cable trough, whereby both ends are configured for connection to a male connector of another cable trough, comprising a tongue, and configured for connection to a female connector of another cable trough, comprising a groove wherein, in connection, the respective tongue is dropped down into the respective groove while the cable trough rests on the ground.

2. A cable trough according to claim 1 wherein at both ends, the groove of the multiway connector is arranged inboard of the tongue of the multiway connector.

3. A cable trough according to claim 1 wherein the groove of each multiway connector is provided in the upper side of the base.

4. A cable trough according to claim 1 wherein the grooves are provided on the inside of the sidewall or plurality of sidewalls.

5. A cable trough according to claim 1 wherein the tongue of each multiway connector is provided on the underside of the base.

6. A cable trough according to claim 1 wherein the tongues extend outwardly from the sidewalls.

7. A cable trough according to claim 1 wherein the tongues are provided at the extreme ends of the cable trough.

8. A cable trough according to claim 1 wherein the first end is provided with a male multiway connector and the second end is provided with a female multiway connector, wherein a male multiway connector has its tongue spaced further from its groove than a female multiway connector, whereby the tongue of a male multiway connector can fit into the groove of a female multiway connector.

9. A cable trough according to claim 1 comprising a bend or curve, whereby the open face of one open end is at an angle to the open face of the other open end.

10. A kit of cable troughs for forming a cable trough system, the kit comprising at least one first cable trough as set out in claim 1; and one or more of: (i) a second cable trough having at least two open ends wherein the first end comprises a female connector comprising a groove and the second end comprises a male connector comprising a tongue; (ii) a third cable trough comprising a T-piece, having three open ends, each end comprising a male connector comprising a tongue or female connector comprising a groove; and (iii) a fourth cable trough comprising a junction box having at least four open ends, each end comprising a male connector comprising a tongue or female connector comprising a groove.

11. A kit according to claim 10 wherein the second cable trough defined in (i) above is straight.

12. A kit according to claim 10 wherein the second cable trough defined in (i) above has a female end identical to the female ends of the third cable trough defined in (ii) above, or the fourth cable trough defined in (iii) above.

13. A kit according to claim 10 wherein the tolerances of the tongues and grooves are chosen to allow up to 20 mm of movement between the male connector and the female connector, to allow a degree of direction change between cable troughs to account for slight deviations in the direction of tracks.

14. A cable trough according to claim 1, comprising a cable tie securing system integrally formed in its base and comprising a plurality of apertures arranged on either side of a centreline of the trough and extending through its base, so as to receive a cable tie.

15. A cable trough according to claim 14 wherein each aperture extends through to the bottom of the trough and is angled or curved so as to guide a cable tie towards the centreline of the trough, below its base.

16. A cable trough according to claim 14 wherein the cable tie securing system comprises a guide arranged beneath the base of the cable trough to guide the cable tie from one aperture to the other aperture, the guide being a cover attached to the underside of the trough and having a channel which lines up with the exit of each aperture at the base, to form a smooth path between the entrances of the apertures in the upper side of the base.

17. A cable trough according to claim 1, comprising a plurality of pairs of slots arranged in the base, and capable of allowing drainage and receiving a cable divider.

18. A cable trough according to claim 17 wherein the pairs of slots are arranged towards opposite ends of the cable trough and aligned with the axis between the two ends of the cable trough.

19. A cable trough according to claim 17 wherein three pairs of slots are provided, arranged such that one is central and the others are on either side of the central pair.

20. A cable trough according to claim 1, comprising a plurality of ribs on the outer surface of the sidewalls, the ribs capable of acting as handles to aid lifting and as anchors for ballast.

21. A lid for a cable trough comprising a base, a plurality of sidewalls, a first open end and a second open end; the lid arranged to be seated on the top of the sidewalls of the cable trough, having an upper surface inclined towards two sides, away from a centreline, in order to aid drainage; wherein the lid has at least two feet on its underside one on each side of the centreline so as to allow one lid to be stacked stably horizontally on another for transportation, despite the inclined upper surface and connection means for connecting to the sidewalls of the cable trough, the connection means being "ducks feet", arranged to be inserted into slots through the upper surface of the sidewalls and engaged underneath the upper surface of the sidewalls by sliding the lid longitudinally, wherein the at least two feet are separated from the connection means.

* * * * *